(12) United States Patent
Jung et al.

(10) Patent No.: US 12,101,427 B2
(45) Date of Patent: Sep. 24, 2024

(54) MOBILE TERMINAL, ELECTRONIC DEVICE COMPRISING MOBILE TERMINAL, AND METHOD FOR CONTROLLING ELECTRONIC DEVICE

(71) Applicant: LG ELECTRONICS INC., Seoul (KR)

(72) Inventors: Wonmoo Jung, Seoul (KR); Doohwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 252 days.

(21) Appl. No.: 17/754,677

(22) PCT Filed: Oct. 25, 2019

(86) PCT No.: PCT/KR2019/014126
§ 371 (c)(1),
(2) Date: Apr. 8, 2022

(87) PCT Pub. No.: WO2021/080044
PCT Pub. Date: Apr. 29, 2021

(65) Prior Publication Data
US 2024/0031467 A1   Jan. 25, 2024

(51) Int. Cl.
*H04M 1/04* (2006.01)
*G06F 1/16* (2006.01)
(Continued)

(52) U.S. Cl.
CPC ...... *H04M 1/72403* (2021.01); *G06F 1/1647* (2013.01); *G06F 3/04817* (2013.01);
(Continued)

(58) Field of Classification Search
CPC .......... H04M 1/72403; H04M 1/72469; H04B 17/318; G06F 1/1647; G06F 3/04817; G06F 3/0486; G06F 3/0488; H04W 4/026
See application file for complete search history.

(56) References Cited

U.S. PATENT DOCUMENTS

2016/0054759 A1* 2/2016 Lee .................. G06F 1/1656
                                                              361/679.28
2016/0224304 A1* 8/2016 Hong ................... H04M 1/724

FOREIGN PATENT DOCUMENTS

KR   10-2012-0089985      8/2012
KR   10-2014-0098384      8/2014
(Continued)

OTHER PUBLICATIONS

PCT International Application No. PCT/KR2019/014126, International Search Report dated Sep. 1, 2020, 4 pages.
(Continued)

*Primary Examiner* — Moustapha Diaby
(74) *Attorney, Agent, or Firm* — LEE, HONG, DEGERMAN, KANG & WAIMEY

(57) ABSTRACT

An embodiment relates to an electronic device including a mobile terminal and a case. The mobile terminal comprises: an interface unit for connecting a first audio device and a second audio device to the mobile terminal; a control unit; and a first display on which a first screen is displayed. The case includes a second display on which a second screen is displayed. The control unit matches the first display and the first audio device, matches the second display and the second audio device, and controls the first audio device and the second audio device such that a first sound corresponding to the first screen is output from the first audio device and a second sound corresponding to the second screen is output from the second audio device.

14 Claims, 24 Drawing Sheets

(51) Int. Cl.
  *G06F 3/04817* (2022.01)
  *G06F 3/0486* (2013.01)
  *G06F 3/0488* (2022.01)
  *H04B 17/318* (2015.01)
  *H04M 1/72403* (2021.01)
  *H04M 1/72469* (2021.01)
  *H04W 4/02* (2018.01)

(52) U.S. Cl.
  CPC .......... *G06F 3/0486* (2013.01); *G06F 3/0488* (2013.01); *H04B 17/318* (2015.01); *H04M 1/72469* (2021.01); *H04W 4/026* (2013.01)

(56) References Cited

FOREIGN PATENT DOCUMENTS

| KR | 10-2015-0107096 | 9/2015 |
| KR | 10-2015-0113732 | 10/2015 |
| KR | 10-2016-0023471 | 3/2016 |
| KR | 10-2017-0081903 | 7/2017 |

OTHER PUBLICATIONS

Korean Intellectual Property Office Application No. 10-2022-7011659, Office Action dated Aug. 21, 2023, 6 pages.

\* cited by examiner (a)

(b)

(c)

(a)

(b)

(a)

(b)

(c)

MOBILE TERMINAL, ELECTRONIC DEVICE COMPRISING MOBILE TERMINAL, AND METHOD FOR CONTROLLING ELECTRONIC DEVICE

CROSS-REFERENCE TO RELATED APPLICATIONS

This application is the National Stage filing under 35 U.S.C. 371 of International Application No. PCT/KR2019/014126, filed on Oct. 25, 2019, the contents of which is hereby incorporated by reference herein in its entirety.

TECHNICAL FIELD

The present disclosure relates to a mobile terminal, an electronic device having a case to which the mobile terminal is coupled, and a method of controlling the electronic device.

BACKGROUND ART

Terminals may be divided into mobile/portable terminals and stationary terminals according to their mobility. Furthermore, mobile terminals may be divided into handheld terminals and vehicle mounted terminals according to whether or not it can be directly carried by a user.

The functions of mobile terminals have been diversified. For example, the functions may include data and voice communication, photographing and video shooting through a camera, voice recording, playing a music file through a speaker system, and displaying an image or video on a display. Some terminals further include an electronic game play function or perform a multimedia player function. In particular, in recent years, mobile terminals may receive multicast signals that provide visual content such as broadcast, video or television programs.

As it becomes multifunctional, for example, such a terminal is allowed to capture still images or moving images, play music or video files, play games, receive broadcast and the like, so as to be implemented as an integrated multimedia player.

On the other hand, a function of allowing a plurality of users to simultaneously play different content items using a single mobile terminal by playing different content items on a plurality of screens with an additional screen connected in a wired or wireless manner is included in the mobile terminal.

However, when a plurality of different content items are played on each of the plurality of screens, there is a problem in that audio sounds are output in an overlapping manner.

Furthermore, when the plurality of users exchange content items with each other to view them, there is an inconvenience in that they also have to exchange audio devices.

DISCLOSURE OF INVENTION

Technical Problem

An aspect of the present disclosure is to provide a mobile terminal capable of extending a display region of a mobile terminal through a case having an additional display interworking with the mobile terminal, and an electronic device having a case to which the mobile terminal is coupled.

Furthermore, an embodiment is to provide an electronic device capable of controlling a display provided in a case through wired communication to allow compatibility with various models and eliminate the need for a separate chip for communication, and a control method thereof.

In addition, an embodiment is to provide an electronic device capable of playing a plurality of content items on a plurality of screens, respectively, using an extended display region interworking therewith through wired communication, and an audio control method of the electronic device.

Moreover, an embodiment is to provide an electronic device capable of outputting different audio sounds through a plurality of audio devices corresponding to a plurality of displays, respectively, and a control method of the electronic device.

Besides, an embodiment is to provide an electronic device capable of allowing a plurality of users to exchange content items with each other to view them without exchanging audio devices with each other, and a control method of the electronic device.

Solution to Problem

An embodiment provides an electronic device including a mobile terminal and a case, the mobile terminal of the electronic device may include a terminal body coupled to the case, a connection port provided on one side of the terminal body, an interface unit that connects a first audio device and a second audio device to the mobile terminal, a controller, and a first display on which a first screen is displayed, wherein the case includes a first body accommodating the terminal body, a connector protruding toward an inner side of the first body to be inserted into the connection port, a second display on which a second screen is displayed, and a wiring portion configured to electrically connect the first body and the second body, wherein the controller controls the first audio device and the second audio device to match the first display to the first audio device, match the second display to the second audio device, output a first sound corresponding to the first screen from the first audio device, and output a second sound corresponding to the second screen from the second audio device, and wherein the first screen is an execution screen of a first application and the second screen is an execution screen of a second application, and the first application and the second application are simultaneously executed.

Furthermore, according to an embodiment, when a first content exchange is performed, the controller may further control the first audio device and the second audio device to match the first display to the first audio device, match the second display to the second audio device, output the second sound from the first audio device, and output the first sound from the second audio device, wherein the performing of the first content exchange includes displaying the second screen on the first display and displaying the first screen on the second display.

Furthermore, according to an embodiment, the performing of the first content exchange may include performing a first direction drag on the first display or performing a second direction drag on the second display.

Furthermore, according to an embodiment, the first direction drag may be a drag in a direction from the first display toward the second display, and the second direction drag may be a drag in a direction from the second display toward the first display.

Furthermore, according to an embodiment, a first exchange icon may be displayed on the first display, a second exchange icon may be displayed on the second display, and the first content exchange may be performed according to a touch of the first exchange icon or the second exchange icon.

Furthermore, according to an embodiment, the interface unit may further be configured to wirelessly connect a third display on which a third screen is displayed and a third audio device to the mobile terminal, wherein the controller further controls the first audio device and the third audio device to match the first display to the first audio device, match the third display to the third audio device, output a first sound corresponding to the first screen from the first audio device, and output a third sound corresponding to the third screen from the third audio device, and wherein the first screen is an execution screen of a first application and the third screen is an execution screen of a third application, and the first application and the third application are simultaneously executed.

Furthermore, according to an embodiment, the interface unit may be further configured to calculate a distance between the mobile terminal and the third display using a signal strength between the mobile terminal and the third display, and to wirelessly connect the third display to the mobile terminal when the distance is included in a reference range.

Furthermore, according to an embodiment, when the distance decreases and then increases in a first direction for a predetermined period of time within the reference range, the controller may further determine that the positions of the mobile terminal and the third display have been exchanged.

Furthermore, according to an embodiment, the controller may further determine that the positions of the mobile terminal and the third display have been exchanged, and then perform a second content exchange, wherein the performing of the second content exchange includes displaying the third screen on the first display and displaying the first screen on the third display, and the signal is a RSSI signal.

Furthermore, according to an embodiment, the electronic device may further include a sensor unit capable of detecting a motion of the mobile terminal, wherein the controller further determines that the positions of the mobile terminal and the third display have been exchanged using the motion.

Furthermore, according to an embodiment, the controller may further perform a second content exchange when it is determined that the positions of the mobile terminal the third display have been exchanged, wherein the performing of the second content exchange includes displaying the third screen on the first display and displaying the first screen on the third display.

Furthermore, according to an embodiment, the motion may be any one of a motion in which an azimuth of the mobile terminal changes, a pitching motion of the mobile terminal, and a rolling motion of the mobile terminal.

Furthermore, according to an embodiment, the electronic device may further include a sensor unit capable of detecting a motion of the mobile terminal, wherein after the distance decreases and then increases in a first direction for a predetermined period of time within the reference range, the controller further determines that the positions of the mobile terminal and the third display have been exchanged using the motion.

Furthermore, according to an embodiment, the controller may further perform a third content exchange when it is determined that the positions of the mobile terminal the third display have been exchanged, wherein the performing of the third content exchange includes displaying the third screen on the first display and displaying the first screen on the third display.

Furthermore, according to an embodiment, the motion may be any one of a motion in which an azimuth of the mobile terminal changes, a pitching motion of the mobile terminal, and a rolling motion of the mobile terminal.

Advantageous Effects of Invention

As described above, according to a mobile terminal, an electronic device having the mobile terminal, and a control method of the electronic device according to an embodiment, there is an effect that different content items can be simultaneously played on a plurality of displays, respectively.

Furthermore, according to a mobile terminal, an electronic device having the mobile terminal, and a control method of the electronic device according to an embodiment, there is an effect that a plurality of audio devices can be connected thereto to output different audio sounds.

In addition, according to a mobile terminal, an electronic device having the mobile terminal, and a control method of the electronic device according to an embodiment, there is an effect that a plurality of users can exchange content items with each other to view them without exchanging audio devices with each other.

MODE FOR THE INVENTION

Figure 1A:
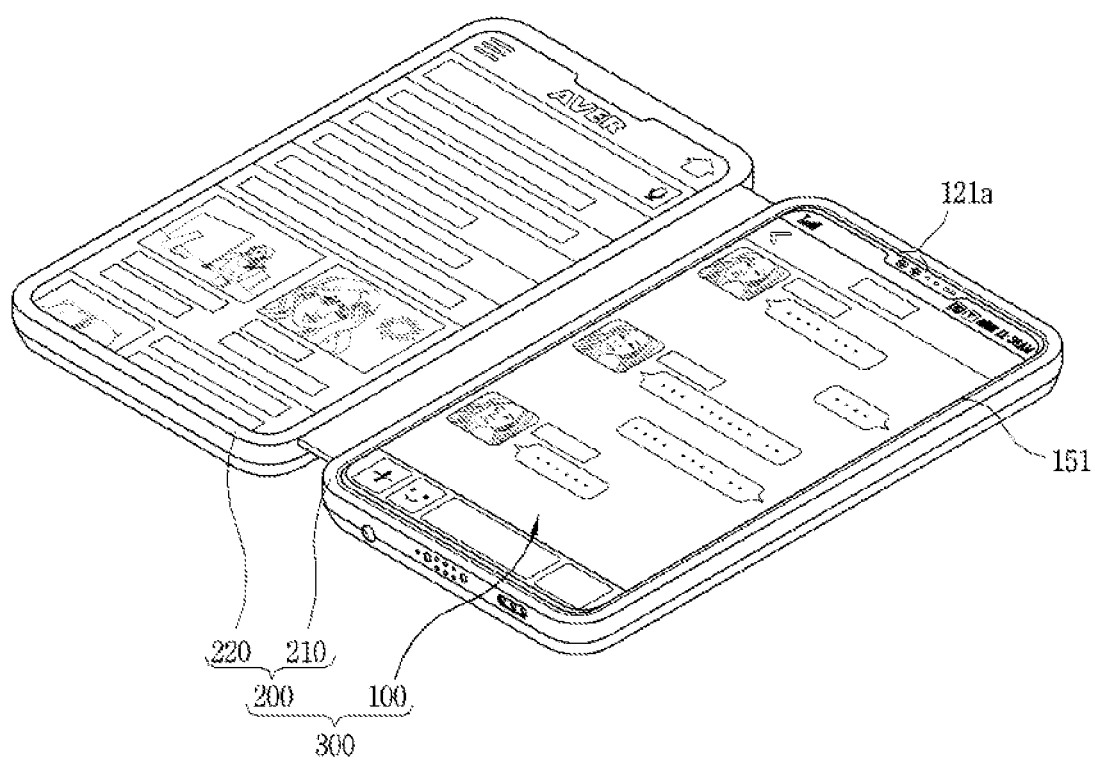
FIGS. 1A and 1B are conceptual views for explaining an electronic device according to an embodiment.
Figure 1B:
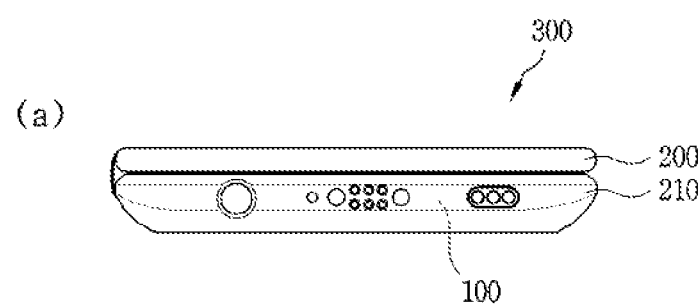
Figure 1B:
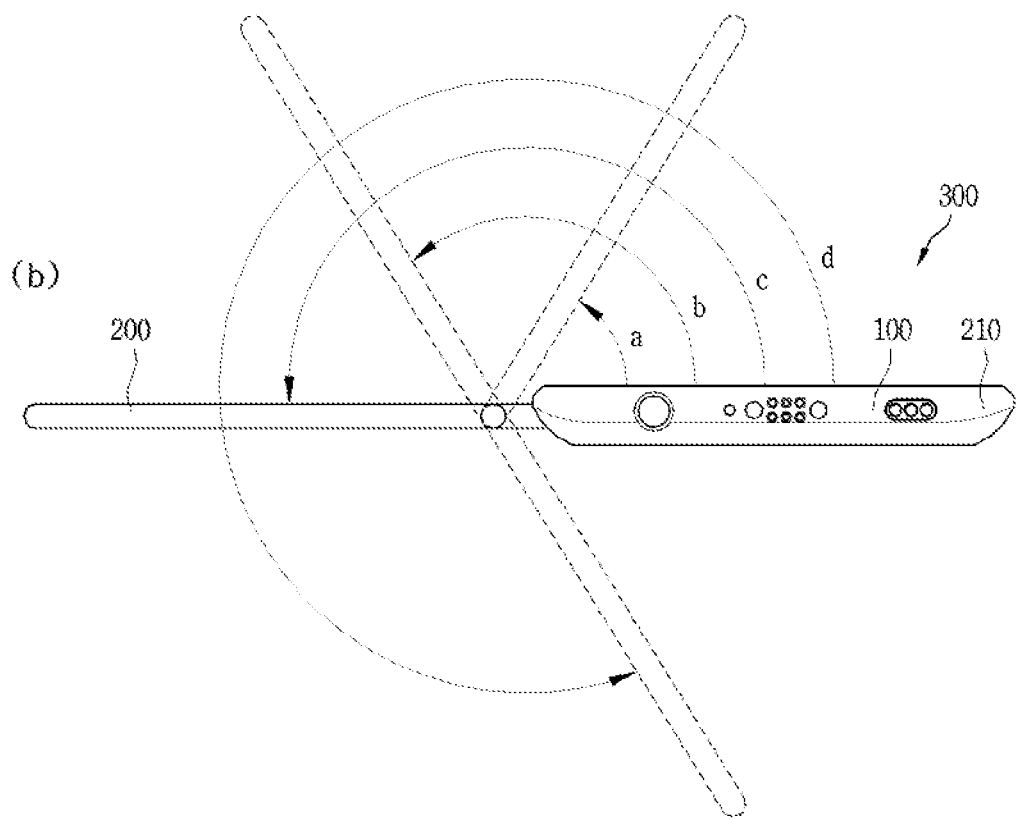
Figure 1B:
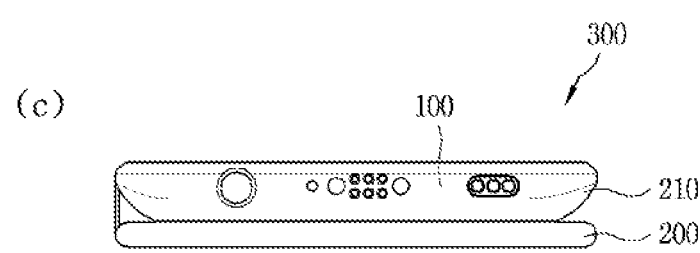

Hereinafter, FIGS. 1A and 1B are conceptual views for explaining an electronic device according to an embodiment.

Referring to the drawings, a mobile terminal 100 is coupled to a case 200, and the mobile terminal 100 and the case 200 are coupled to constitute one electronic device 300.

In this case, the mobile terminal may be implemented using a variety of different types of terminals. Examples of such terminals include cellular phones, smart phones, laptop computers, digital broadcast terminals, personal digital assistants (PDAs), portable multimedia players (PMPs), navigators, slate PCs, tablet PCs, ultra-books, wearable devices (for example, smart watches, smart glasses, head mounted displays (HMDs)), and the like. Details of the mobile terminal will be described later with reference to FIG. 3.

The case 200 may be a pouch that protects outer surfaces of the mobile terminal 100 or covers or accommodates at least one surface of the mobile terminal 100 as an accessory of the mobile terminal 100. The case 200 may be configured to expand a function of the mobile terminal 100 in combination with the mobile terminal 100.

Meanwhile, in the present disclosure, information output from the mobile terminal may be processed in association with a structure or a function of the case 200. For example, referring to FIG. 1A, the case 200 may include a display (hereinafter, referred to a "second display 250") interworking with a display (hereinafter, a "first display 151") of the mobile terminal.

The case may include a first body 210 and a second body 220 that are rotatably connected to each other, and the display 250 may be disposed on any one of the first body 210 and the second body 220.

For example, the first body 210 may be disposed to accommodate at least a portion of the mobile terminal body. As a rear side of the mobile terminal is accommodated in the first body 210, and the first display 151 disposed on a front side of the mobile terminal is exposed outside.

In addition, there may be provided at least one hole at one side of the first body 210, so that at least a part of components of the mobile terminal exposed outside the case performs a function when the mobile terminal 100 is coupled to the first body 210.

Here, the mobile terminal 100 may be detachably coupled to the first body 210. In addition, the mobile terminal may be configured to detect whether the mobile terminal is coupled to the first body 210. For the detection, the first body 210 may include a magnet 245 at one side thereof facing the mobile terminal 100, and the mobile terminal may include a hall sensor 143 at the rear side thereof which is configured to sense a magnetic field corresponding to the magnet 245 when the mobile terminal is coupled to the first body. When the magnetic field is sensed by the hall sensor, the mobile terminal may recognize that it is coupled to the case, and then perform predetermined control.

For example, when a magnetic field is sensed by the hall sensor 143, a controller 180 of the mobile terminal 100 may supply an operating current to the second display 250 provided on the second body 220 or perform a preparation process into a state capable of transmitting a signal to the second display 250. That is, the preset control may denote an operation related to the preparation process.

Here, the 'preparation process' denotes a standby state in which the controller of the mobile terminal 100 can immediately perform a next process when an operating current is supplied to the second display 250. Therefore, even if the magnetic field is sensed by the hall sensor 143, a current is not immediately supplied to the second display 250.

Meanwhile, when it is detected that a connector provided at one side of the first body 210, for example, at a lower end of the first body 210 and a connection port provided at a lower end of the mobile terminal accommodated in the first body 210 are mutually coupled, the controller 180 of the mobile terminal may supply an operating current to the second display 250 provided on the second body 220.

Specifically, an operating current may be supplied from a power supply of the mobile terminal 100 to a circuit board on the second display 250 through a flexible printed circuit board (FPCB) connected by the connector and a wiring portion (e.g., a coaxial cable) provided in a connection portion 230 of the case 200.

To this end, the controller 180 of the mobile terminal may be configured to recognize resistances Ra, Rd in the first body 210 through a specific contact pin of the connector provided in the first body 210, detect a coupling of the connector and the connection port, and accordingly supply an operating current. This will be described in more detail below.

The second display 250 provided on the second body 220 may be configured to operate based on power supplied from the mobile terminal 100.

The second display 250 may be disposed on the second body 220 to extend a display region of the first display 151 or may be operated independently of the first display 151. For example, content related to information displayed on the first display 151 may be mirrored to be displayed on the second display 250.

In addition, execution screens of different applications may be displayed on the first and second displays 151, 250, respectively. As another example, an execution screen of one application may be divided and displayed on the first and second displays 151, 250. Also, screens corresponding to different execution steps or different tasks of one application may be displayed on the first and second displays 151, 250.

Furthermore, the mobile terminal 100 is configured to control screen information output to the second display 250, and for this purpose, a communication link for wired communication (e.g., a USB 2.0 communication link) may be established between the mobile terminal 100 and the second display 250.

Meanwhile, both the first and second displays 151, 250 are exposed outside in open state, and the open state may be defined with reference to FIG. 1B.

Referring to FIG. 1B, the first body 210 and the second body 220 of the case 200 may be relatively rotated between closed state in (a) of FIG. 1B and flipped state in (c) of FIG. 1B.

The closed state is the state in (a) of FIG. 1B, wherein the first body 210 of the case 200 is covering the first display 151 of the mobile terminal 100. Here, the first display 151 is covered by the first body 210. That is, the closed state may be a state in which the first display 151 is covered by the second display 250. In the closed state, the mobile terminal 100 and the case 200 overlap each other in a thickness direction of the mobile terminal, and thus form a diary-like shape, thereby improving user portability.

In the closed state, a body of the mobile terminal 100 accommodated in the first body 210 may not be exposed outside. In addition, in the closed state, a sub-display 250a to display notification information corresponding to a specific event generated from the mobile terminal 100 may be exposed from one side of a front surface of the second body 220 including the second display 250.

In the closed state, the second body 220 is rotated relative to the first body 210 to be changed to the open state.

The open state is a state in which the first display is not covered by the second display 250, and between the first and second displays 151, 250 forms a specific angle other than 0 degrees.

Specifically, the open state may be one of a 'first state' in which the first and second displays 151, 250 form about 60 degrees (a), a 'second state' in which the first and second displays 151, 250 form about 120 degrees (b), a 'third state' in which the first and second displays 151, 250 form about 180 degrees (c), and a 'fourth state' in which the first and second displays 151, 250 form about 270 degrees (d), as illustrated in (b) of FIG. 1B.

In the open state, the first body 210 and the second body 220 may be fixed at a specific angle to become any one of the first to fourth states, and a fixing member to fix the bodies at a specific angle may be provided in the second body 220.

The controller 180 of the mobile terminal may control the mobile terminal to perform different operation modes in any one of the first to fourth states. For example, in the first state, the mobile terminal may operate in a 'privacy protection mode', and in the second state, the mobile terminal may operate in a 'laptop mode'. In addition, in the third state, the mobile terminal may operate in a 'display extension mode', and in the fourth state, may operate in a 'multi-display mode'.

A state in which the first and second displays 151, 250 are exposed outside is defined as the 'open state'. In the 'open state', the first display 151 is not covered by the second display 250. Accordingly, a state in which the first display 151 is covered by the second display 250 is defined as the 'closed state'. The open state and the closed state may be distinguished by a sensing value of an illuminance sensor provided on a front surface of the first display 151.

Meanwhile, as illustrated in (c) of FIG. 1B, a state in which the first and second displays 151, 250 rotate with respect to each other by 360 degrees such that a rear surface of the first body 210 on which the first display 151 is disposed is completely covered by a rear surface of the second body 220 on which the second display 250 is disposed may be defined as a 'flip state' in the open state. In the 'flipped state', the first and second displays 151, 250 are exposed outside to face opposite directions to each other.

In the flip state, components provided on the rear surface of the mobile terminal 100 coupled to the first body 210, for example, the rear camera 121b, the optical output module 154, and the flash 124, the user input unit 123a may be detected by recognizing a state covered by the rear surface of the second body 220.

In addition, the first state to the fourth state, and the flipped state may be detected by a separate sensor provided in the connection portion 230 that couples the first and second bodies 210, 220 to be relatively rotatable or separate sensors provided on rear surfaces of the first and second bodies 210, 220.

The electronic device 300 of the present disclosure may perform an operation of controlling the first and second displays 151, 250 in cooperation with the open state and closed state. As an example, when the first and second displays 151, 250 are operated in inactive state in the closed state and are changed from the closed state to the open state, at least one of the first and second displays 151, 250 may be activated.

As an example, when changed to the open state, both the first display 151 and the second display 250 may be changed to active state. Here, different home screen pages may be displayed on the first and second displays 151, 250, respectively, or identical home screen pages may be displayed on the first and second displays 151, 250. In addition, various information may be displayed on the first and second displays 151, 250 according to circumstances.

As another example, when changed to the open state, the first display 151 is switched to active state, and the second display 250 may be maintained in the inactive state.

The second display 250 may include a touch sensor configured to sense a touch applied to the second display 250. Also, the second display 250 may be configured to sense a touch even in the inactive state.

In relation to the touch sensed by the touch sensor, the second display 250 may be operated in active state when a preset type of touch is applied to the second display 250 in the open state. Alternatively, the second display 250 may be operated in active state based on a touch applied to the first display 151 in the open state.

Meanwhile, when a touch is applied to the second display 250, the second display 250 may transmit a touch signal corresponding to the touch to the mobile terminal 100. Then, when the touch according to the received touch signal corresponds to a preset type of touch, the mobile terminal 100 may transmit a signal corresponding to a control command to activate the second display 250 to the second display 250 side.

Then, the second display 250 and the controller of the second display 250 may be activated based on the signal received from the mobile terminal 100.

The transmission and reception of the signal may be performed by a wired communication method combining the connector provided on one side of the first body 210 and the connection port provided on the mobile terminal 100.

Meanwhile, a structure of the case to implement the operation of the electronic device described above will be described in more detail below.

Figure 2A:
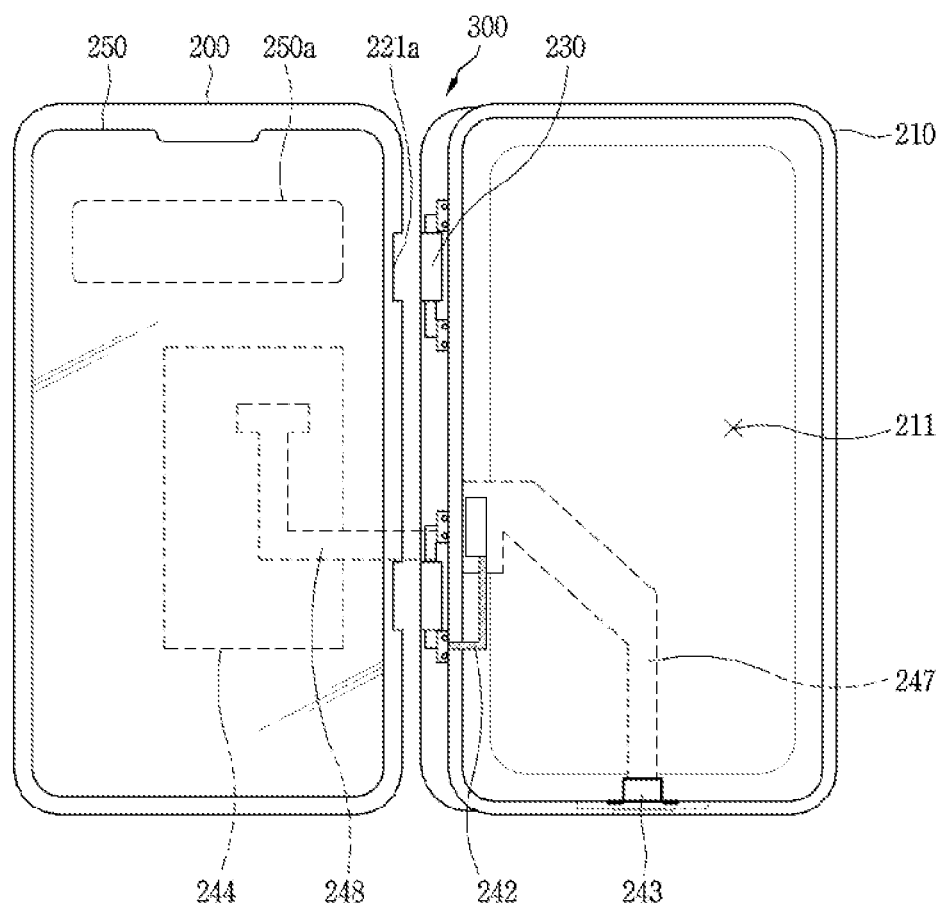
FIGS. 2A, 2B, 2C, and 2D are conceptual views for explaining a main structure of an electronic device according to an embodiment.

Referring to FIG. 2A, the first body 210 of the case 200 includes an accommodating space 211 configured to accommodate a rear surface of the body of the mobile terminal. The first body accommodates at least a portion of the mobile terminal in the accommodating space 211, and the rear surface of the mobile terminal is disposed on a bottom surface of the accommodating space 211.

The second body 220 on which the second display 250 is disposed is rotatably coupled to the first body by the connection portion 230. That is, the connection portion 230 is disposed between the first body 210 and the second body 220 to couple the first body 210 and the second body 220 so that the first body 210 and the second body 220 are relatively rotatable.

The sub-display 250a to display predetermined information, for example, time information or event notification, may be provided on a front side of the second body 220. In this case, a simple event notification can be immediately checked through the sub-display 250a in the closed state without switching the electronic device 300 to the open state.

Referring to FIGS. 2A to 2D, the second body 220 may include a first cover 221, a second cover 222, and the second display 250. A receiving groove 221a that accommodates at least a part of the connection portion 230 may be disposed in the first cover 221. In addition, the second cover 222 is coupled to the first cover 221, and may be a frame in which various electronic components are mounted. As such an example, a circuit board 248 on the second display 250 side, which will be described later, may be mounted on the second cover 222.

The second cover 222 may be rotatably coupled to the connection portion 230, and a groove may be disposed at a position corresponding to the receiving groove 221a of the first cover 221 on the second cover 222, and the connection portion 230 may be disposed in the groove 222a. In this case, the second display 250 may be mounted on the second cover 222.

In addition, a signal transmitted from the controller of the mobile terminal is transmitted to the second display 250 side through a wiring portion 242, for example, a coaxial cable, provided on an inner side of the connection portion 230 and connected to a flexible printed circuit board 247 provided on a rear side of the first body 210. Hereinafter, the flexible printed circuit board provided on the rear side of the first body 210 and combined with the wiring portion 242 of the connection portion 230 will be referred to as a 'first flexible printed circuit board' 247. In addition, a flexible printed circuit board provided on a rear side of the second body 220 and combined with the wiring portion 242 of the connection portion 230 is referred to as a 'second flexible printed circuit board' 248.

The connection portion 230 may include a first hinge 231 and a second hinge 232 spaced apart along a side surface of the first body 210. The first hinge 231 and the second hinge 232 may each include a hinge body 233 and a hinge shaft 234.

A hinge groove (not shown) is disposed in the hinge body 233, and the hinge shaft 234 is inserted into the hinge groove so that the first and second bodies 210, 220 can rotate relative to each other. The hinge shaft 234 may be provided in plural, and coupling portions 235 coupled to the first body 210 and the second body 220, respectively, may be disposed on one side of the hinge shaft 234.

In addition, the wiring portion 242, for example, a coaxial cable, to be connected to a first flexible printed circuit board 247 and a second flexible printed circuit board 248 is provided on the inner side of the connection portion 230.

A connector 243 protruded toward the accommodating space 211 accommodating the mobile terminal and inserted into the connection port provided on one side of the mobile terminal body may be disposed on one side of the first body 210. To this end, at least one hole H through which at least a portion of a connector module including the connector 243a penetrates may be disposed on one side of the first body 210, for example, a side surface of a lower end.

Although not all illustrated, the connector 243 may be disposed to be rotatable 180 degrees toward the outside of the case, or may be disposed to be drawn in or out of the case by external force. In this case, even if there exists the connector 243, the mobile terminal body can be easily accommodated in the first body 210.

Alternatively, in one example, the first body 210 may be detachable in a vertical direction or at least an upper portion of the first body 210 may be made of a flexible material so that the mobile terminal body can be easily accommodated in the first body 210.

The connector module in which the connector 243a is installed may be mounted on one side of the first body 210, for example, at a center of a lower end. The connector 243 may be installed at one end of the connector module, and a charging port having a female pogo pin to be coupled to an external male pin may be installed at another end.

The connector 243 may be connected to a circuit board 244 to control the second display 250 through the first flexible printed circuit board 247, the second flexible printed circuit board 248, and the wiring portion 242. In addition, the connector 243 may be connected to the circuit board 244 through coupling with the connection port of the mobile terminal body. Here, the connection port provided in the mobile terminal body may denote, for example, a USB port.

A side of the second display 250 performs wired communication with the mobile terminal 100 through the first and second flexible circuit boards 247, 248, the wiring portion 242, and the circuit board 244 coupled through the connector 243. Furthermore, the mobile terminal 100 performs wired communication with the second display 250 through a connection port connected to the connector 243. In this regard, the connection port of the mobile terminal 100 may be referred to as a 'first wired communication unit', and the connector 243 of the case may be referred to as a 'second wired communication unit'.

A first wired communication unit 161 and a second wired communication unit 243 may perform USB communication. The first wired communication unit 161 may perform USB I/O communication to transmit a signal to the case side through the second wired communication unit 243.

In addition, the second wired communication unit 243 may perform USB I/O communication to transmit a signal to the mobile terminal through the first wired communication unit 161. Here, the USB I/O communication may refer to USB 2.0 or USB 3.0 communication.

A USB (Universal Serial Bus), which is a common connector, is defined as an interface standard that enables connection of various peripheral devices. In the USB (Universal Serial Bus), a host necessarily exists, and communication is performed by a control through the host.

Figure 2B:
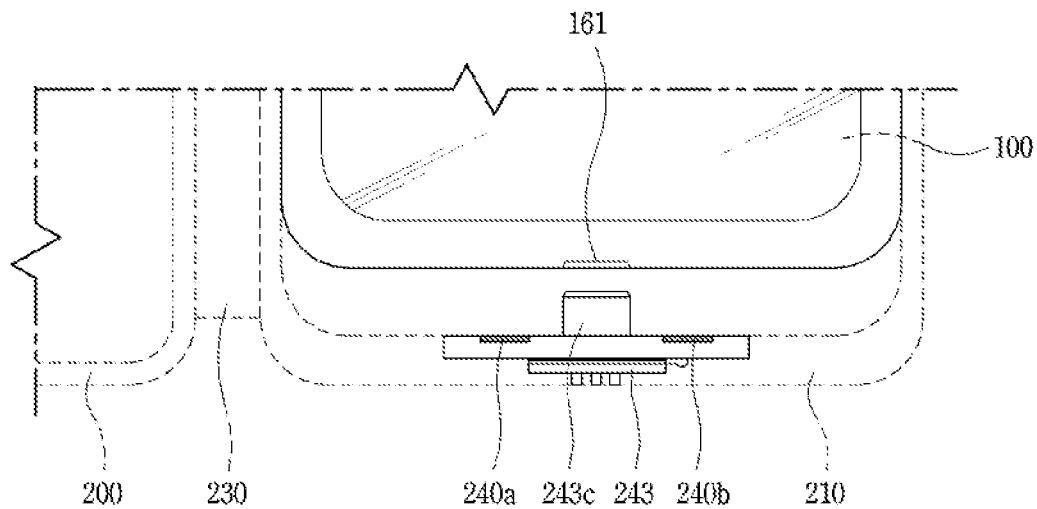
Figure 2C:
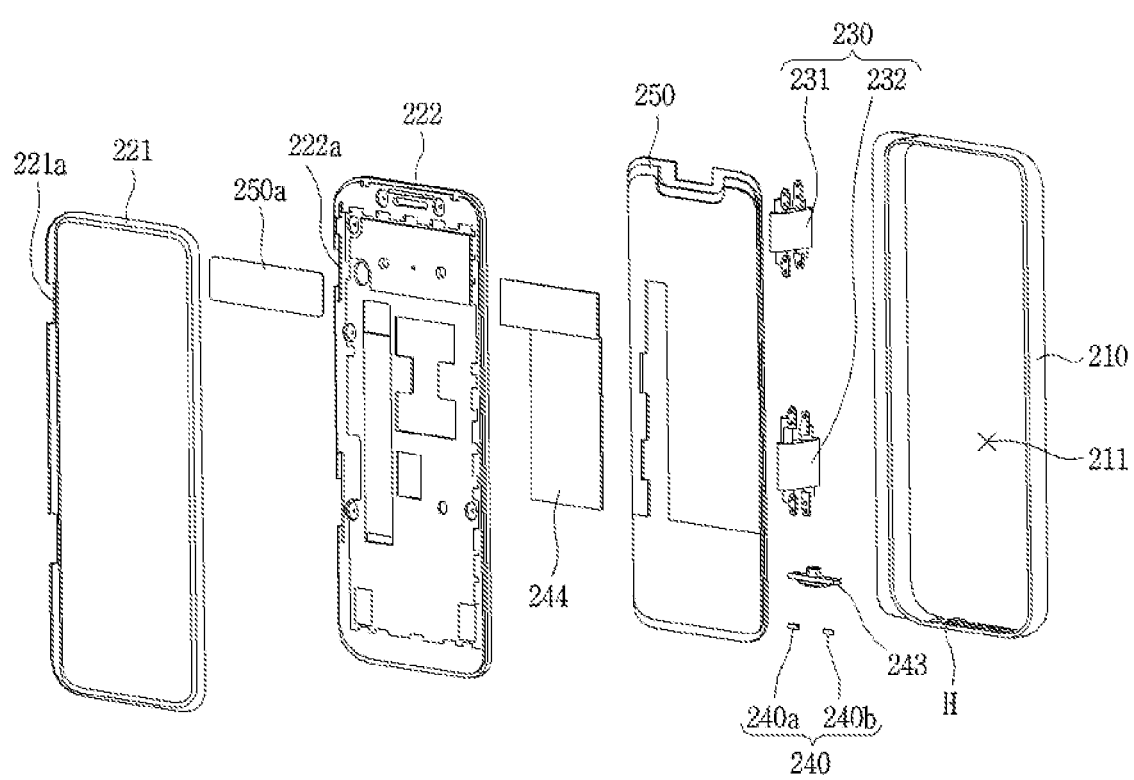
Figure 2D:
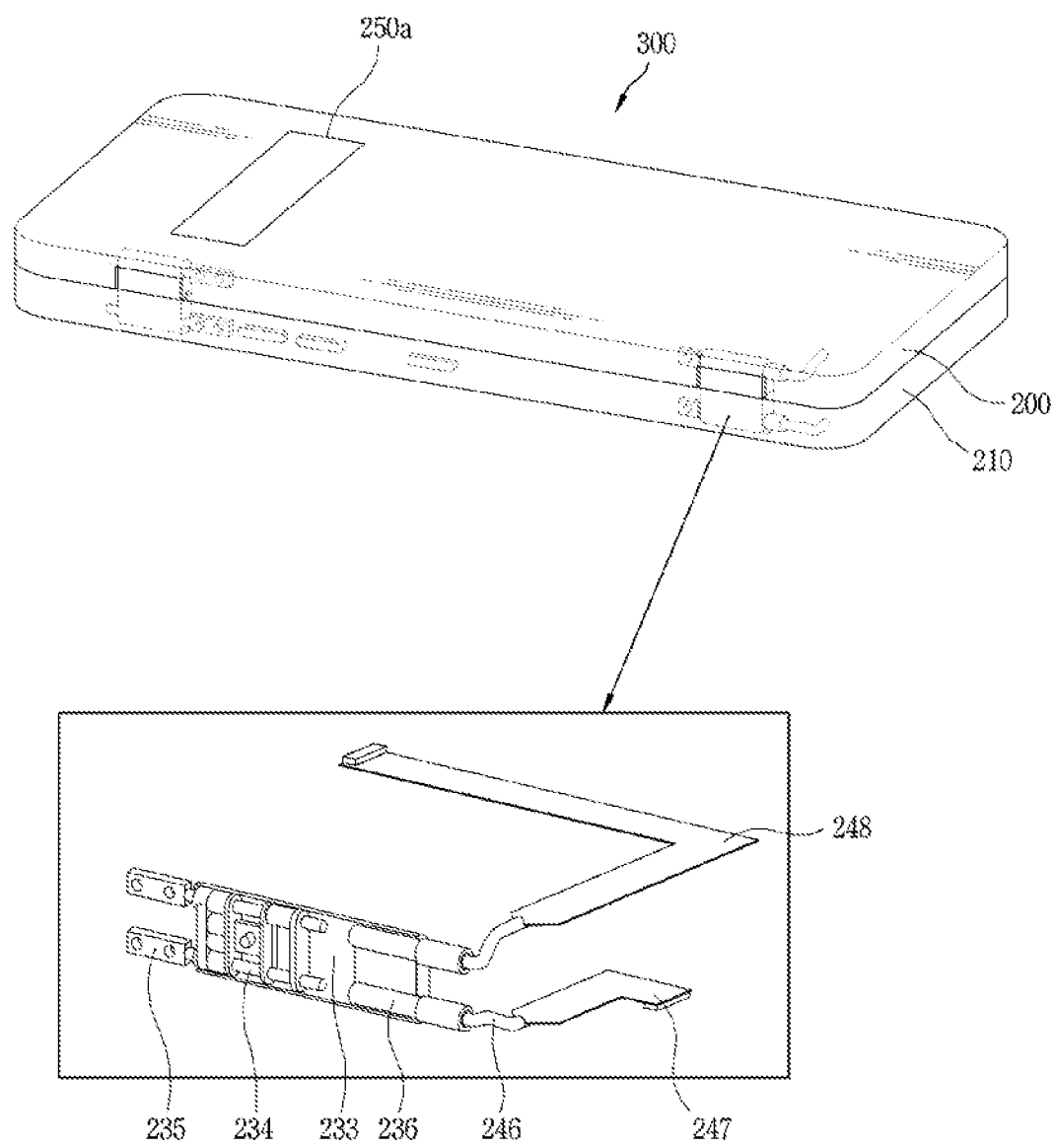

Referring to FIG. 2B, the connector 243 provided at the lower end of the first body 210 of the case and connected to the connection port of the mobile terminal may be mounted on the connector module. One end of the connector 243 is joined to a supporting member of the connector module, and another end of the connector 243 may define a protrusion 243c. The connector 243 is connected to the connection port of the mobile terminal as the protrusion 243c is inserted in a direction from the outside to inside of the mobile terminal.

A plurality of contact pins (e.g., male pins) may be provided inside the connector, and each of the plurality of contact pins may be set to perform a specific function when connected to pins of the connection port of the mobile terminal (e.g., female pins). This will be described in more detail below.

Meanwhile, according to FIG. 2A, the first body 210 is provided with the first flexible circuit board 247 connected to the connector 243. The first flexible circuit board 247 may be connected to the second flexible printed circuit board 248 and the circuit board 244 at a side of the second display 250 through the wiring portion 242, for example, a coaxial cable, inside the connection portion 230.

In this way, the first body 210 does not have a separate circuit board for wireless communication or the like other than the first flexible printed circuit board 247, so that the first body 210 becomes thinner, and the mobile terminal also does not need to have a separate circuit board for wireless communication. Accordingly, a compatibility of the mobile terminal mountable in the case is further improved, and an overall thickness of the electronic device can be fabricated thinner.

According to the drawing, the first body 210 and the second body 220 are coupled to the circuit board 244 via the wiring portion 242 coupled to the first and the second flexible printed circuit boards 247, 248, and they are electrically connected to each other. The circuit board 244 may be connected to the second display 250 to transmit a signal received from the mobile terminal 100 to the second display 250.

That is, the circuit board 244 may transmit data transmitted and received from the mobile terminal through the first wired communication unit 161 and the second wired communication unit 243 to the second display 250.

The wiring portion 242 electrically connects the first body 210 and the second body 220 through the connection portion 230. For this connection, a connection passage through which the wiring portion 242 passes may be disposed in the connection portion 230.

As an example of this, the first hinge 231 and the second hinge 232 have an accommodating space accommodating at least a part of the wiring portion 242. For example, the wiring portion 242 connected to the first flexible printed circuit board 247 that is coupled with the second wired communication unit 243 may be accommodated in the second hinge 232. In addition, the first hinge 231 and the second hinge 232 may be defined in a mutually symmetrical structure or shape.

The first wired communication unit 161 and the second wired communication unit 243 may be disposed at a lower side of the case 200 and the mobile terminal 100. In this case, the first flexible printed circuit board 247 connected to the wiring portion 242 may also be disposed to be connected to one of the first hinge 231 and the second hinge 232 from the lower side.

In addition, the second hinge 232 may include an extending portion 236 extending from the hinge body 233, and the extending portion 236 may include cables 246 extended to the first body 210 and the second body 220, respectively. The accommodating space is disposed in the extending portion 236, and the cables 246 are accommodated in the accommodating space. The first flexible printed circuit board and second flexible printed circuit boards 247, 248 are disposed at both ends of the cables 246, and the first and second flexible printed circuit boards 247, 248 are electrically connected to the circuit board 244. According to the structure, a signal controlling the second display 250 is transmitted from the mobile terminal to the first body 210 and the second body 220 through the first wired communication unit 161 and the second wired communication unit 243.

Meanwhile, referring to the drawings, at the lower end of the first body 210 of the case, there may be disposed the connector 243 connected to the connection portion of the mobile terminal so that the second display 250 and the circuit board 244 receive power from the mobile terminal. The connector 243 supplies power of the mobile terminal to the circuit board 244 through the first flexible printed circuit board 247, the wiring portion 242, and the second flexible printed circuit board 248, and the circuit board 244 provides the power to the second display 250.

According to the structure, power supplied to the second display 250 and a signal transmitted to the second display 250 may be transmitted through a wired path in the mobile terminal.

According to the above-described structure, the electronic device performs an operation of controlling the first display 151 and the second display 250 to interwork with each other using wired communication and a wired power supply path. Hereinafter, the structure and the function of the mobile terminal will be described first, and then the control operation will be described.

Figure 3A:
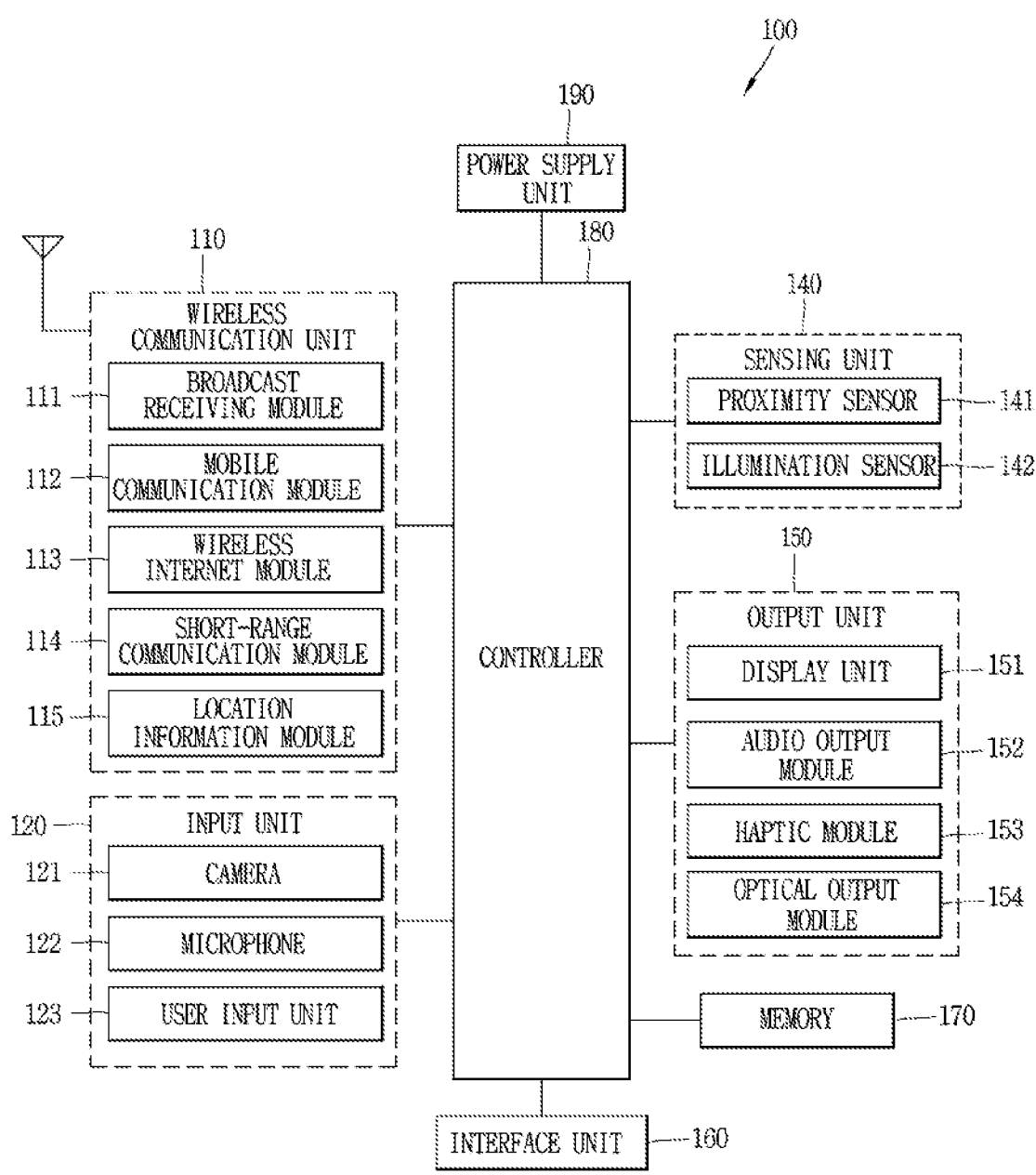
FIGS. 3A, 3B and 3C are conceptual views for explaining an example of a mobile terminal related to the present disclosure.
Figure 3B:
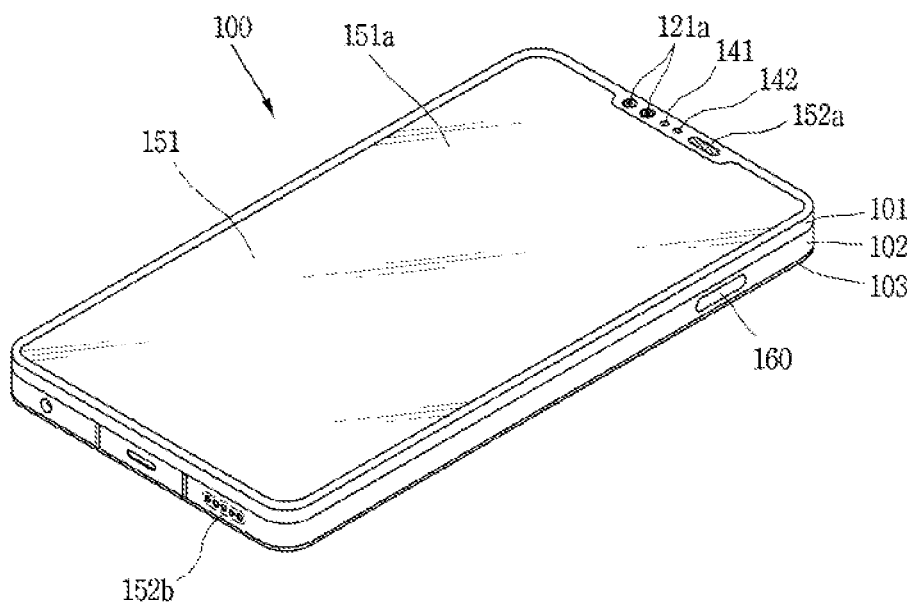
Figure 3C:
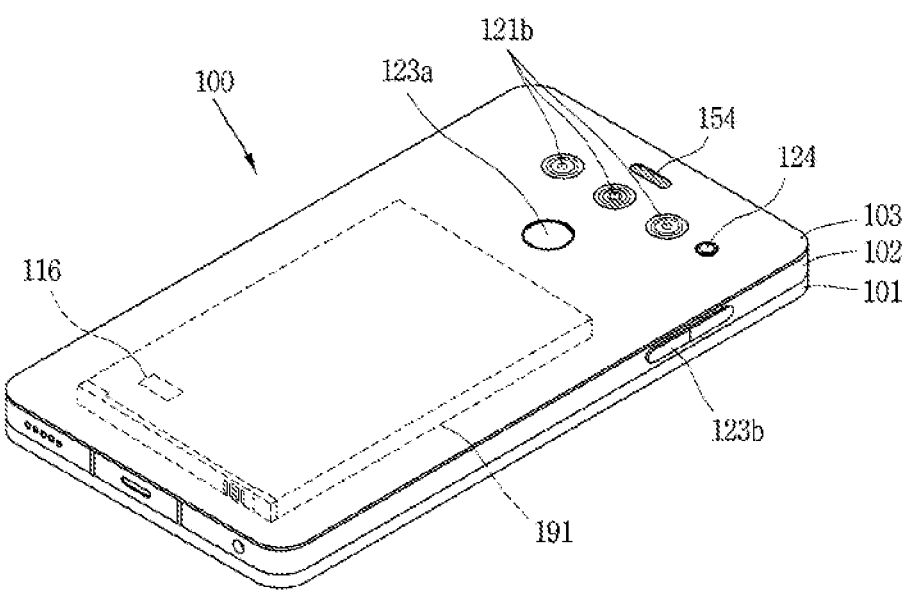

FIGS. 3A, 3B and 3C are conceptual views for explaining an example of a mobile terminal related to the present disclosure. The mobile terminal 100 according to an embodiment may be coupled to a case of the electronic device described above.

Referring to FIGS. 3A through 3C, FIG. 3A is a block diagram for explaining a mobile terminal associated with the present disclosure, and FIGS. 3B and 3C are conceptual views illustrating an example in which the mobile terminal associated with the present disclosure is seen from different directions.

The mobile terminal 100 may include components, such as a wireless communication unit 110, an input unit 120, a sensing unit 140, an output unit 150, an interface unit 160, a memory 170, a controller 180, a power supply unit 190 and the like. The components shown in FIG. 3A are not essential for implementing a mobile terminal, and thus the mobile terminal described herein may have more or fewer components than those listed above.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and an external server. In addition, the wireless communication unit 110 may include one or more modules for connecting the mobile terminal 100 to one or more networks.

The wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a power supply unit gauge (battery gauge), an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). On the other hand, the mobile terminal disclosed herein may utilize information in such a manner of combining information sensed by at least two sensors of those sensors.

The output unit 150 may be configured to output an audio signal, a video signal or a tactile signal. The output unit 150 may include a first display 151, an audio output module 152, a haptic module 153, an optical output module 154 and the like. The first display 151 may have an inter-layered structure or an integrated structure with a touch sensor in order to implement a touch screen. The touch screen may provide an output interface between the mobile terminal 100 and a user, as well as functioning as the user input unit 123 which provides an input interface between the mobile terminal 100 and the user.

The interface unit 160 may serve as an interface with various types of external devices connected with the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

In addition, the memory 170 stores data that support various functions of the mobile terminal 100. The memory 170 is typically implemented to store data to support various functions or features of the mobile terminal 100. For instance, the memory 170 may be configured to store application programs executed in the mobile terminal 100, data or instructions for operations of the mobile terminal 100, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). On the other hand, the application programs may be stored in the memory 170, installed in the mobile terminal 100, and executed by the controller 180 to perform an operation (or a function) of the mobile terminal 100.

The controller 180 may typically control an overall operation of the mobile terminal 100 in addition to the operations associated with the application programs. The controller 180 may provide or process information or functions appropriate for a user in a manner of processing signals, data, information and the like, which are input or output by the aforementioned components, or activating the application programs stored in the memory 170.

Furthermore, the controller 180 may control at least part of the components illustrated in FIG. 1A, in order to drive the application programs stored in the memory 170. In addition, the controller 180 may drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 includes a power supply unit, and the power supply unit may be a built-in power supply unit or a replaceable power supply unit.

At least part of those elements and components may be combined to implement operation and control of the mobile terminal or a control method of the mobile terminal according to various exemplary embodiments described herein. Furthermore, the operation and control or the control method of the mobile terminal may be implemented in the mobile terminal in such a manner of activating at least one application program stored in the memory 170.

Hereinafter, each aforementioned component will be described in more detail with reference to FIG. 3A, prior to explaining various exemplary embodiments implemented by the mobile terminal 100 having the configuration.

First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and/or a terrestrial channel. At least two broadcast receiving modules 111 may be provided in the mobile terminal 100 to simultaneously receive at least two broadcast channels or switch the broadcast channels.

The mobile communication module 112 may transmit/receive wireless signals to/from at least one of network entities, for example, a base station, an external terminal, a server, and the like, on a mobile communication network, which is constructed according to technical standards or transmission methods for mobile communications (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), etc.)

Here, the wireless signals may include audio call signal, video (telephony) call signal, or various formats of data according to transmission/reception of text/multimedia messages.

The wireless Internet module 113 refers to a module for supporting wireless Internet access, and may be built-in or externally installed on the mobile terminal 100. The wireless Internet module 113 may transmit and/or receive wireless signals via communication networks according to wireless Internet technologies.

Examples of such wireless Internet access may include Wireless LAN (WLAN), Wireless-Fidelity (Wi-Fi), Wireless Fidelity Direct (Wi-Fi Direct), Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), LTE (Long Term Evolution), LTE-A (Long Term Evolution-Advanced), and the like. The wireless Internet module 113 may transmit/receive data according to at least one wireless Internet technology within a range including even Internet technologies which are not aforementioned.

From the perspective that the wireless Internet accesses according to Wipro, HSDPA, GSM, CDMA, WCDMA, LTE, LTE-A and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks. The short-range communication module 114 denotes a module for short-range communications.

Here, the another mobile terminal 100 may be a wearable device, for example, a smart watch, smart glasses or a head mounted display (HMD), capable of exchanging (interworking) data with the mobile terminal 100 according to an embodiment. The short-range communication module 114 may sense (or recognize) a wearable device capable of communicating with the mobile terminal 100 in the vicinity of the mobile terminal 100. In addition, when the sensed wearable device is a device which is authenticated to communicate with the mobile terminal 100 according to an embodiment, the controller 180 may transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a WiFi module, or both. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information associated with a wireless access point (AP) which transmits or receives a wireless signal to or from the Wi-Fi module. According to the need, the location information module 115 may perform any function of the other modules of the wireless communication unit 110 to obtain data on the location of the mobile terminal. As a module used to acquire the location (or current location) of the mobile terminal, the location information module 115 may not be necessarily limited to a module for directly calculating or acquiring the location of the mobile terminal.

Then, the input unit 120 is configured to provide video information (or signal), audio information (or signal), data or an input of information entered by a user, and the mobile terminal 100 may include one or a plurality of cameras 121 to enter video information. The camera 121 processes an image frame, such as still picture or video, acquired by an image sensor in a video phone call or image capturing mode. The processed image frames may be displayed on the first display 151 or stored in the memory 170. On the other hand, the plurality of cameras 121 disposed in the mobile terminal 100 may be arranged in a matrix configuration. By use of the cameras 121 having the matrix configuration, a plurality of image information having various angles or focal points may be input into the mobile terminal 100. As another example, the cameras 121 may be located in a stereoscopic arrangement to acquire left and right images for implementing a stereoscopic image.

The microphone 122 may process an external audio signal into electric audio data. The processed audio data may be utilized in various manners according to a function being executed in the mobile terminal 100 (or an application program being executed). On the other hand, the microphone 122 may include assorted noise removing algorithms to remove noise generated in the course of receiving the external audio signal.

The user input unit 123 may receive information input by a user. When information is input through the user input unit 123, the controller 180 may control an operation of the mobile terminal 100 to correspond to the input information. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

On the other hand, the sensing unit 140 may sense at least one of internal information of the mobile terminal, surrounding environment information of the mobile terminal and user information, and generate a sensing signal corresponding to it. The controller 180 may control an operation of the mobile terminal 100 or execute data processing, a function or an operation associated with an application program installed in the mobile terminal based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen.

The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity sensor 141 may sense proximity of a pointer to the touch screen by changes of an electromagnetic field, which is responsive to an approach of an object with conductivity. In this case, the touch screen (touch sensor) may also be categorized as a proximity sensor.

On the other hand, for the sake of brief explanation, a behavior in which the pointer is positioned to be proximate onto the touch screen without contact will be referred to as "proximity touch," whereas a behavior in which the pointer substantially comes into contact with the touch screen will be referred to as "contact touch." For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving state, etc.). On the other hand, the controller 180 may process data (or information) corresponding to the proximity touches and the proximity touch patterns sensed by the proximity sensor 141, and output visual information corresponding to the process data on the touch screen. In addition, the controller 180 may control the mobile terminal 100 to execute different operations or process different data (or information) according to whether a touch with respect to the same point on the touch screen is either a proximity touch or a contact touch.

A touch sensor may sense a touch (or touch input) applied onto the touch screen (or the first display 151) using at least one of various types of touch methods, such as a resistive type, a capacitive type, an infrared type, a magnetic field type, and the like.

As an example, the touch sensor may be configured to convert changes of pressure applied to a specific part of the touch screen or a capacitance generated from the specific part into electric input signals. The touch sensor may be configured to detect a position, an area where a touch object applying a touch onto the touch screen is touched on the touch sensor, a pressure at the time of touch, a capacitance at the time of touch, and the like. Here, the touch object body may be a finger, a touch pen or stylus pen, a pointer, or the like as an object through which a touch is applied to the touch sensor.

When a touch input is sensed by a touch sensor, corresponding signals may be transmitted to a touch controller. The touch controller may process the received signals, and then transmit corresponding data to the controller 180. Accordingly, the controller 180 may sense which region of the first display 151 has been touched. Here, the touch controller may be a component separate from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swipe touch, a hovering touch, and the like.

An ultrasonic sensor may be configured to recognize position information relating to a sensing object by using ultrasonic waves. Meanwhile, the controller 180 may calculate the location of a wave generating source through information sensed from the optical sensor and the plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

The camera 121 constructing the input unit 120 may be a type of camera sensor. The camera sensor may include at least one of a photo sensor (or image sensor) and a laser sensor.

Implementing the camera 121 with a laser sensor may allow detection of a touch of a physical object with respect to a 3D stereoscopic image. The photo sensor may be laminated on the display device. The photo sensor may be configured to scan a motion of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The first display 151 displays (outputs) information processed by the mobile terminal 100. For example, the first display 151 may display execution screen information of an application program driven in the mobile terminal 100 or user interface (UI) and graphic user interface (GUI) information in response to the execution screen information.

Furthermore, the first display 151 may also be implemented as a stereoscopic display for displaying stereoscopic images.

The stereoscopic display may employ a stereoscopic display scheme such as stereoscopic scheme (a glass scheme), an auto-stereoscopic scheme (glassless scheme), a projection scheme (holographic scheme), or the like.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may also provide audible output signals associated with a particular function (e.g., a call signal reception sound, a message reception sound, etc.) carried out by the mobile terminal 100. The audio output module 152 may include a receiver, a speaker, a buzzer or the like.

A haptic module 153 may generate various tactile effects the that user may feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be configured to transmit tactile effects through a user's direct contact, or a user's muscular sense using a finger or a hand. Two or more haptic modules 153 may be provided according to the particular configuration of the mobile terminal 100.

An optical output module 154 may output a signal for indicating an event generation using light of a light source. Examples of events generated in the mobile terminal 100 may include a message reception, a call signal reception, a missed call, an alarm, a schedule notice, an email reception, an information reception through an application, and the like.

A signal output by the optical output module 154 may be implemented in such a manner that the mobile terminal emits monochromatic light or light with a plurality of colors.

The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. A device having the identification module (hereinafter, an "identification device") may be fabricated in the form of a smart card. Accordingly, the identifying device may be connected with the terminal 100 via the interface unit 160.

Furthermore, when the mobile terminal 100 is connected with an external cradle, the interface unit 160 may serve as a passage to allow power from the cradle to be supplied to the mobile terminal 100 therethrough or may serve as a passage to allow various command signals input by the user from the cradle to be transferred to the mobile terminal therethrough. Such various command signals or power inputted from the cradle may operate as signals for recognizing that the mobile terminal 100 has accurately been mounted to the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 170 over the Internet.

As aforementioned, the controller 180 may typically control the general operations of the mobile terminal 100. For example, the controller 180 may execute or release a locked state for restricting a user from inputting a control command with respect to applications when a state of the mobile terminal meets a preset condition.

Furthermore, the controller 180 may also perform controlling and processing associated with voice calls, data communications, video calls, and the like, or perform pattern recognition processing to recognize a handwriting input or a picture drawing input performed on the touch screen as characters or images, respectively. In addition, the controller 180 may control any one or a combination of the foregoing components in order to implement various embodiments, which will be described below, on the mobile terminal 100 according to an embodiment.

The power supply unit 190 may receive external or internal power to provide power required by various components under the control of the controller 180. The power supply unit 190 may include a power supply unit, which is typically rechargeable built-in power supply unit or may be detachably coupled to the terminal body for charging or the like.

Furthermore, the power supply unit 190 may include a connection port. The connection port may be configured as one example of the interface unit 160 to which an external (re)charger for supplying power to recharge the power supply unit is electrically connected.

As another example, the power supply unit 190 may be configured to recharge the power supply unit in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable or its similar medium using, for example, software, hardware, or any combination thereof.

Referring now to FIGS. 3B and 3C, the mobile terminal 100 is described with reference to a bar-type terminal body. However, the present disclosure may not be necessarily limited thereto, and may be also applicable to various structures such as a watch type, a clip type, a glasses type, a folder type in which two or more bodies are coupled to each other in a relatively movable manner, a flip type, a slide type, a swing type, a swivel type, and the like. The present disclosure relates to a specific type of mobile terminal, but the description of a specific type of mobile terminal may be also applicable to another type of mobile terminal in general.

Here, the terminal body may be understood as a conception which indicates the mobile terminal 100 as at least one assembly.

The mobile terminal 100 may include a case (for example, a frame, a housing, a cover, etc.) constituting the appearance thereof. In this embodiment, the case may be divided into a front case 101 and a rear case 102. Various electronic components may be incorporated into a space disposed between the front case 101 and the rear case 102. At least one middle case may be additionally positioned between the front case 101 and the rear case 102.

The first display 151 may be disposed on a front surface of the terminal body to output information. As illustrated, a window 151a of the first display 151 may be mounted to the front case 101 so as to define the front surface of the terminal body together with the front case 101.

In some cases, electronic components may also be mounted to the rear case 102. Examples of those electronic components mounted to the rear case 102 may include a detachable power supply unit, an identification module, a memory card and the like. Here, a back cover 103 for covering the electronic components mounted may be detachably coupled to the rear case 102. Therefore, when the back cover 103 is separated from the rear case 102, the electronic components mounted to the rear case 102 may be externally exposed.

As illustrated, when the back cover 103 is coupled to the rear case 102, a side surface of the rear case 102 may be partially exposed. In some cases, upon the coupling, the rear case 102 may also be completely shielded by the rear cover 103. Meanwhile, the rear cover 103 may be provided with an opening portion for exposing the camera 121b, the optical output module 154, the flash 124, the rear input unit 123a, and the like to the outside.

The cases 101, 102, 103 may be formed by injection-molding synthetic resin or may be formed of a metal, for example, stainless steel (STS), aluminum (Al), titanium (Ti), or the like.

Unlike the example which the plurality of cases form an inner space for accommodating such various components, the mobile terminal 100 may be configured such that one case forms the inner space. In this case, the mobile terminal 100 having a uni-body formed in such a manner that synthetic resin or metal extends from a side surface to a rear surface may also be implemented.

On the other hand, the mobile terminal 100 may include a waterproofing unit (not shown) for preventing an introduction of water into the terminal body. For example, the waterproof portion may include a waterproof member provided between the window 151a and the front case 101, between the front case 101 and the rear case 102, or between the rear case 102 and the back cover 103, to hermetically seal an inner space when those cases are coupled to each other.

The mobile terminal 100 may include a first display 151, first and second audio output modules 152a and 152b, a proximity sensor 141, an illumination sensor 152, an optical output module 154, first and second cameras 121a and 121b, first and second manipulation units 123a and 123b, a microphone 122, an interface unit 160 and the like. Hereinafter, as illustrated in FIGS. 1B and 1C, the mobile terminal 100 will be described as an example in which the first display 151, the first audio output module 152a, the proximity sensor 141, the illumination sensor 142, and the first camera 121a are disposed on a front surface of the terminal body, the second manipulation unit 123b, the second audio output module 152b, the microphone 122, and the interface unit 160 are disposed on a side surface of the terminal body, and the optical output module 154, the manipulation unit 123a, the second camera 121b, and the flash 124 are disposed on a rear surface of the terminal body.

However, the foregoing configuration may not be necessarily limited to the arrangement. The foregoing configuration may be excluded, substituted or disposed on another surface if necessary. For example, the manipulation unit may not be disposed on the front surface of the terminal body, and the second audio output module 152b may be disposed on the rear surface other than the side surface of the terminal body.

The first display 151 displays (outputs) information processed by the mobile terminal 100. For example, the first display 151 may display execution screen information of an application program driven in the mobile terminal 100 or user interface (UI) and graphic user interface (GUI) information in response to the execution screen information.

The first display 151 may include at least one of a liquid crystal display (LCD), a thin film transistor-liquid crystal display (TFT-LCD), an organic light emitting diode (OLED), a flexible display, a 3-dimensional (3D) display, and an e-ink display.

The first display 151 may be implemented in two or more in number according to a configured aspect of the mobile terminal 100. In this case, a plurality of displays may be spaced apart from each other or disposed integrally on one surface, or may be respectively disposed on different surfaces in the mobile terminal 100.

The first display 151 may include a touch sensor that detects a touch onto the first display 151 so as to receive a control command in a touching manner. When a touch is input to the first display 151, the touch sensor may be configured to detect this touch and the controller 180 may generate a control command corresponding to the touch. Content entered using a touch method may be a character or number, or a menu item that can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The first display 151 may define a touch screen together with the touch sensor. Here, the touch screen may serve as the user input unit 123 (see FIG. 3A). In some cases, the touch screen may replace at least some of the functions of the user manipulation unit.

The first audio output module 152a may be implemented in the form of a receiver for transferring voice sounds to the user's ear or a loud speaker for outputting various alarm sounds or multimedia reproduction sounds.

The window 151a of the first display 151 may include a sound hole for emitting sounds generated from the first audio output module 152a. Here, the present disclosure may not be limited to this. It may also be configured such that the sounds are released along an assembly gap between the structural bodies (for example, a gap between the window 151a and the front case 101). In this case, a hole independently disposed to output audio sounds may not be seen or is otherwise hidden in terms of appearance, thereby further simplifying the appearance and manufacturing of the mobile terminal 100.

The optical output module 154 may output light for indicating an event generation. Examples of the event may include a message reception, a call signal reception, a missed call, an alarm, a schedule notice, an email reception, information reception through an application, and the like. When a user's event check is sensed, the controller 180 may control the optical output module 154 to end the output of light.

The first camera 121a may process video frames such as still or moving images acquired by the image sensor in a video call mode or a capture mode. The processed video frames may be displayed on the first display 151 or stored in the memory 170.

The manipulation units 123a and 123b are examples of the user input unit 123, which may be manipulated by a user to input a command for controlling the operation of the mobile terminal 100. The manipulation units 123a and 123b may employ any method if it is a tactile manner allowing the user to perform manipulation with a tactile feeling such as touch, push, scroll or the like. In addition, the manipulation units 123a and 123b may also employ a method of allowing the user to perform manipulation without a tactile feeling through a proximity touch, a hovering touch, or the like.

The manipulation unit 123a may be configured with a mechanical key, or a combination of a touch key and a push key. In addition, the manipulation unit 123a may be configured in a layered form with a fingerprint sensor.

The content input by the manipulation units 123a and 123b may be set in various ways. For example, the first and the second manipulation units may receive a command such as menu, home key, cancel, search, or the like, and may receive a command, such as controlling a volume level being output from the first or second audio output module 152a or 152b, switching into a touch recognition mode of the first display 151, or the like.

On the other hand, as another example of the user input unit 123, a rear input unit (not shown) may be disposed on the rear surface of the terminal body. The rear input units are manipulated to enter a communication for controlling the operation of the mobile terminal 100, and the content being entered may be set in various ways. For example, the rear input unit may be used by the user to input a command, such as power on/off, start, end, scroll or the like, controlling a volume level being output from the first or second audio output module 152a or 152b, switching into a touch recognition mode of the first display 151, or the like. The rear input unit may be implemented into a form allowing a touch input, a push input or a combination thereof.

The rear input unit may be disposed to overlap with the first display 151 of the front surface in a thickness direction of the terminal body. For an example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the first display 151 may be implemented to have a larger screen.

On the other hand, the mobile terminal 100 may include a fingerprint recognition sensor for recognizing a user's fingerprint, and the controller 180 may use fingerprint information sensed through the finger recognition sensor as an authentication means. The finger scan sensor may be installed in the first display 151 or the user input unit 123.

The microphone 122 may be configured to enter the user's voice, other sounds, and the like. The microphone 122 may be provided at a plurality of positions to receive stereo sounds.

The interface unit 160 may serve as a path allowing the mobile terminal 100 to exchange data with external devices. For example, the interface unit 160 may be at least one of a connection terminal for connecting to another device (for example, an earphone, an external speaker, or another display), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may be arranged in a matrix form. The cameras may be referred to as an 'array camera.' When the second camera 121b is implemented as the array camera, images may be captured in various manners using the plurality of lenses and images with better qualities may be obtained.

The flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement a stereo function in conjunction with the first audio output module 152a, and may be also used to implement a speakerphone mode during a call.

At least one antenna for wireless communication may be disposed on the terminal body. The antenna may be installed in the terminal body or disposed on the case. For example, an antenna which configures a part of the broadcast receiving module 111 (see FIG. 3A) may be retractable into the terminal body. Alternatively, an antenna may be disposed in a form of film to be attached onto an inner surface of the rear cover 103 or a case including a conductive material may serve as an antenna.

A power supply unit 190 (see FIG. 3A) for supplying power to the mobile terminal 100 may be disposed on the terminal body. The power supply unit 190 may include the power supply unit 191 which is mounted in the terminal body or detachably coupled to an outside of the terminal body.

The power supply unit 191 may receive power via a power source cable connected to the interface unit 160. Furthermore, the power supply unit 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the power supply unit 191, so as to prevent separation of the power supply unit 191 and protect the power supply unit 191 from an external impact or foreign materials. When the power supply unit 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may interwork with the first display 151 to extend the function of the mobile terminal 100. Another example of the accessory may be a touch pen for assisting or extending a touch input onto a touch screen.

Meanwhile, the electronic device according to an embodiment is configured, such that the connection port of the interface unit 160 provided on one side (e.g., lower end of side surface) of the mobile terminal, that is, the first wired communication unit 161 and the connector provided at one side of the first body 210 of the case 200, i.e., the second wired communication unit 243 are combined together to supply power and to perform wired communication for transmission and reception of various signals.

Here, it has been described that the wired communication is performed using a USB I/O interface standard. However, it is not limited thereto, and it should be noted that other interface standards for wired communication may be applied.

Figure 4:
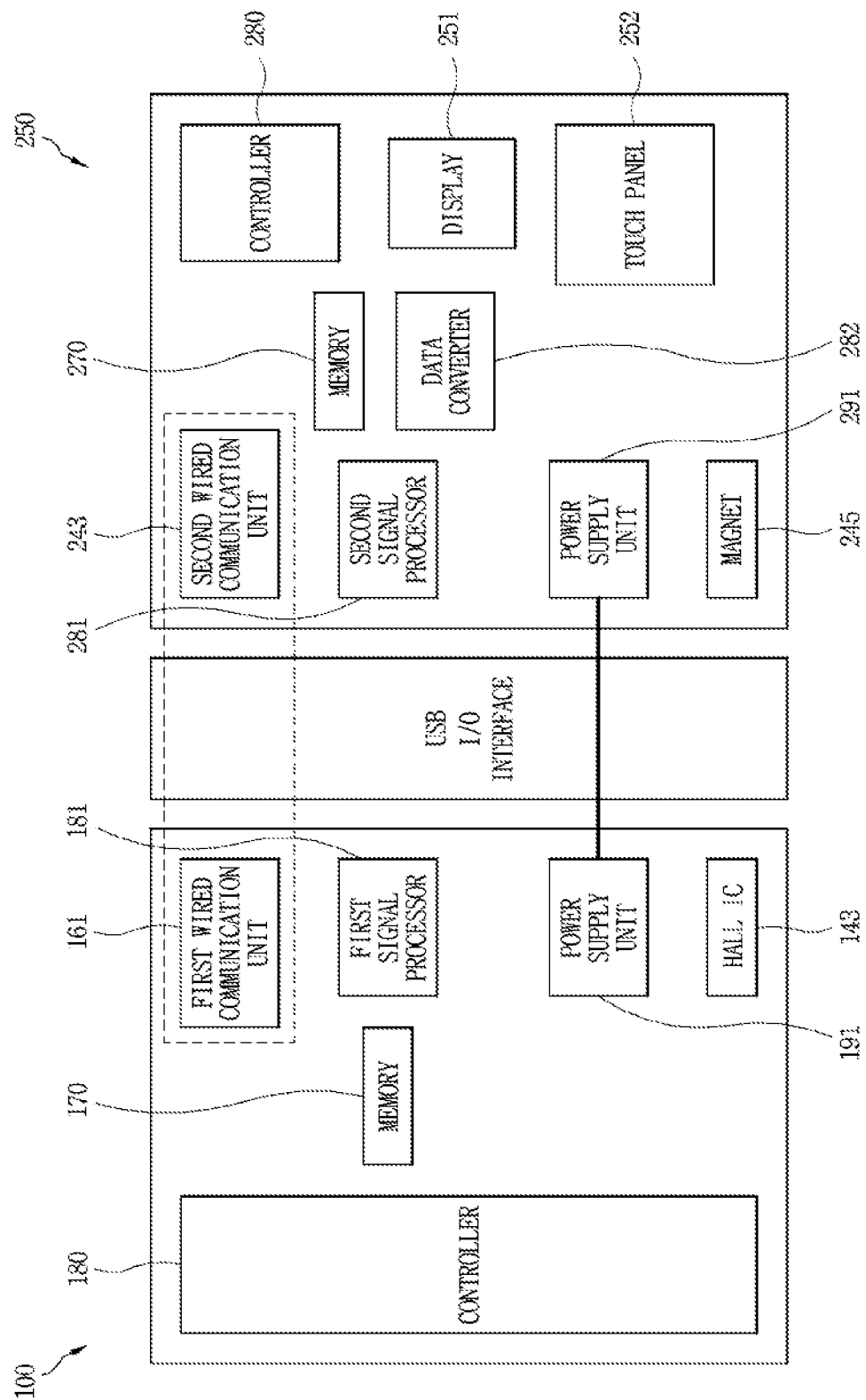
FIG. 4 is a block diagram for explaining a control method between a mobile terminal and a display provided in a case in an electronic device according to an embodiment.

Hereinafter, a method for performing wired communication between the first wired communication unit 161 and the second wired communication unit 243 will be described in more detail with reference to the accompanying drawings. FIG. 4 is a conceptual view illustrating a method for controlling between the mobile terminal and the display provided in the case in the electronic device according to an embodiment.

The mobile terminal 100 according to an embodiment may be coupled to the first body 210, and when the mobile terminal 100 is coupled to the first body 210, the connector 243 provided in the first body 210 is inserted into the connection port provided in the mobile terminal 100, and wired communication may be performed through the first wired communication unit 161 and the second wired communication unit 243.

At this time, the first body 210 on the case side becomes a host device of the mobile terminal, and may perform wired communication, for example, USB communication, with the mobile terminal 100.

The first wired communication unit 161 provided in the mobile terminal 100 may be included in the interface unit 160 described with reference to FIG. 3A. The interface unit 160 includes a plurality of contact pins, and is configured to identify a host device connected to the contact pins by the controller 180 of the mobile terminal.

The first wired communication unit 161 may be provided on a side surface of the lower end of the mobile terminal 100. In addition, the second wired communication unit 243 may be provided to correspond to a position in contact with the first wired communication unit 161 when the mobile terminal 100 is accommodated in the first body 210 of the case. That is, the second wired communication unit 243 may be provided on a side surface of the lower end of the first body 210.

In the present disclosure, when the mobile terminal 100 is accommodated in the first body 210, and the connector pin of the second wired communication unit 243 provided in the first body 210 is inserted into the port of the first wired communication unit 161 of the mobile terminal, wired communication, for example, USB I/O communication, may be performed through the first wired communication unit 161 and the second wired communication unit 243.

Accordingly, the mobile terminal 100 may supply an operating current to the second display 250 through the USB I/O interface, and transmit a control signal or an image signal. Also, in the second display 250, a touch signal may be transmitted to the mobile terminal 100 through the USB I/O interface to process the touch signal corresponding to the touch input applied to the second display 250.

Meanwhile, supply of the above-described operating current and transmission of the control signal and the image signal may be performed through different wired communication paths. To this end, the first wired communication unit 161 and the second wired communication unit 243 may include a plurality of connector pins, and may be set to use different contact pins according to the type of the transmitted signal.

Since the second wired communication unit 243 is inserted into the first wired communication unit 161 and coupled to the case, a plurality of contact pins molded in the second wired communication unit 243 is exposed to the outside. In the present disclosure, a structure in which the plurality of contact pins includes, for example, 12 pins, has been described as an example.

Meanwhile, although not illustrated, the first and second wired communication units 161, 243 may have a waterproof member (not shown) molded together with the plurality of contact pins to prevent fluid from outside or to prevent fluid from moving inside. In addition, the waterproof member may be replaced with an O-ring having an elastic force.

The second wired communication unit 243 provided in the first body 210 is configured to transmit and receive wired data from the mobile terminal to the second display 250 through the wiring portion 242 included in the connection portion 230. In addition, the second wired communication unit 243 may communicate with the first wired communication unit 161 to perform unidirectional communication (data flow from the mobile terminal 100 to the second display 250) or bidirectional communication (bidirectional data flow between the mobile terminal 100 and the second display 250).

The first wired communication unit 161 and the second wired communication unit 243 according to the embodiment may include a contact-type connector method. For example, the contact-type connector method may include a USB-C type connector or a lightning cable method.

In addition, the first wired communication unit 161 and the second wired communication unit 243 may be configured to transmit and receive various types of data in a wired communication method. For example, it may be one of graphic data, audio data, video data, touch event data, data related to control, and a combination thereof.

Meanwhile, the second display 250 provided in the second body 220 may be configured to operate based on power supplied from the power supply unit 191 of the mobile terminal 100.

Here, the power may be transmitted to the second display 250 and the circuit board 244 provided on the second body 220, through the connector 243 connected to the connection port of the mobile terminal 100, the wiring portion 242 coupled to the first flexible printed circuit board 247 and provided in the connection portion 230, and the second flexible printed circuit board 248, as described above.

The power supply unit 191 of the mobile terminal 100 is configured to supply an operating current (or power) to a power supply unit 291 of the second display 250 through an electric connection path of the first wired communication unit 161 connected to the connection port, the first flexible printed circuit board 247, the wiring portion 242 provided in the connection portion 230, and the second flexible printed circuit board 248 provided in the second body 220. Here, the action current is supplied to the second display 250 through a specific contact pin provided in the first wired communication unit 161, for example, a 'CC1' pin of a USB C-type.

Meanwhile, the mobile terminal 100 may be detachably coupled to the first body 210. In addition, the mobile terminal may be configured to detect whether the mobile terminal is coupled to the first body 210. For the detection, the first body 210 may include a magnet 245 at one side thereof facing the mobile terminal 100, and the mobile terminal may include a hall sensor 143 at the rear side thereof which is configured to sense a magnetic field corresponding to the magnet 245 when the mobile terminal is coupled to the first body. When the magnetic field is sensed by the hall sensor, the mobile terminal may recognize that it is coupled to the case, and then perform predetermined control.

Here, the preset control does not denote supplying an operating current as described above.

When the first and second wired communication units 161, 243 are connected to enable mutual communication, the mobile terminal 100 may recognize a plurality of resistances Ra, Rd disposed in the first body 210 by specific contact pins (e.g., CC1, CC2) among a plurality of contact pins included in the first wired communication unit 161 provided in the first body 210. When the plurality of resistances are recognized as described above, an operating current is supplied to the second display 250 by supplying the power, for example, Vconn to CC1.

When action current is supplied to the second display 250, a system of the second display 250 is booted and initialized, and becomes an operable standby state.

Here, the second display 250 is either in active state or in inactive state, and even when the second display 250 is inactive, a touch sensor (or a touch panel 252) provided in the second display 250 is operated in active state to sense a touch applied to the second display 250.

On the other hand, when the second display 250 is activated, the controller of the mobile terminal 100 transmits an image signal corresponding to screen information to be displayed on the display 251 provided on the second display 250 to the second wired communication unit 243 side through the first wired communication unit 161. Here, a wired communication path of the image signal is different from the wired communication path for supplying power.

For example, the power may be supplied to the second display 250 through a wired communication path through the CC1 pin provided in the second wired communication unit 243, and the image signal may be transmitted to the second display 250 through a wired communication path through the USB SS1 and SS2 pins.

Data may be received from the first wired communication unit 161 to the second display 250 through the second wired communication unit 243 and the circuit board 244. Here, a digital image signal may convert the data into a form that can be displayed on the second display 250 through a data converter 282. For example, the second display 250 may be configured as an LCD panel, and in this case, the digital image signal of a DP format received from the mobile terminal 100 may be converted into a data format (MIPI format) that can be received on the LCD panel through the data converter 282 to be transferred and displayed on the display 251.

Meanwhile, data transmitted and received through the first wired communication unit 161 and the second wired communication unit 243 may be transmitted and received using different contact pins in the USB I/O interface according to a type of the data.

Specifically, for example, the image signal may be transmitted and received from the mobile terminal 100 to the second display 250 through a USB SSPHY pin, and may be converted into a format that can be displayed on the second display 250 (e.g., MIPI format) through the data converter 282. In addition, for example, a control signal related to the operation of the second display 250 may be transmitted and received to the second display 250 through an external display port (EDP) AUX pin.

Signals that need to be transmitted between the mobile terminal 100 and the display 250, such as communication control signals, touch signals, and brightness control signals, can be transmitted and received through a first and a second signal processor 181, 281 using a second USB human interface device (HID) communication.

Here, in the mobile terminal 100 in an initial state, the first signal processor 181 transmits and receives signals through the first USB communication by using A6 and A7 pins on an A side, and B6 and B7 pins on a B side of the connector. Meanwhile, the first and second wired communication units 161, 234 are connected to enable mutual communication, and when a plurality of resistances Ra, Rd is recognized through the CC1 pin, they are switched by switches and the A side pins and B side pins used in the initial state are separated to transmit and receive signals by using the second USB communication only using B6 and B7 pins on the B side.

As described above, when switches are switched to process signals by using the second USB communication, the first and second signal processors 181, 281 may perform 12c conversion by USB human interface device (HID) communication to perform an operation corresponding to a touch applied to the second display 250, for example, transmission of a touch signal corresponding to the touch. Also, the first and second signal processors 181, 281 may support hot plug detect (HPD) communication between the controller 280 and the data converter 282 through the second USB communication.

Meanwhile, initialization of the second display 250 may be controlled by the controller 280 included in the second display 250.

As aforementioned, the mobile terminal according to the embodiment may control information displayed on the display 250 provided in the case 200. That is, the operation of the second display 250 may be controlled by the mobile terminal 100. To this end, the case 200 to which the mobile terminal is coupled may be identified when the connection port of the mobile terminal and the connector provided in the case 200 are connected and a plurality of resistances are recognized. Therefore, since there is no need to provide a separate chip for communication between the mobile terminal and the case 200 in the present disclosure, the case 200 is compatible with various models of mobile terminals, cost can be saved, and a thickness of the case 200 can be thinner.

Figure 5:
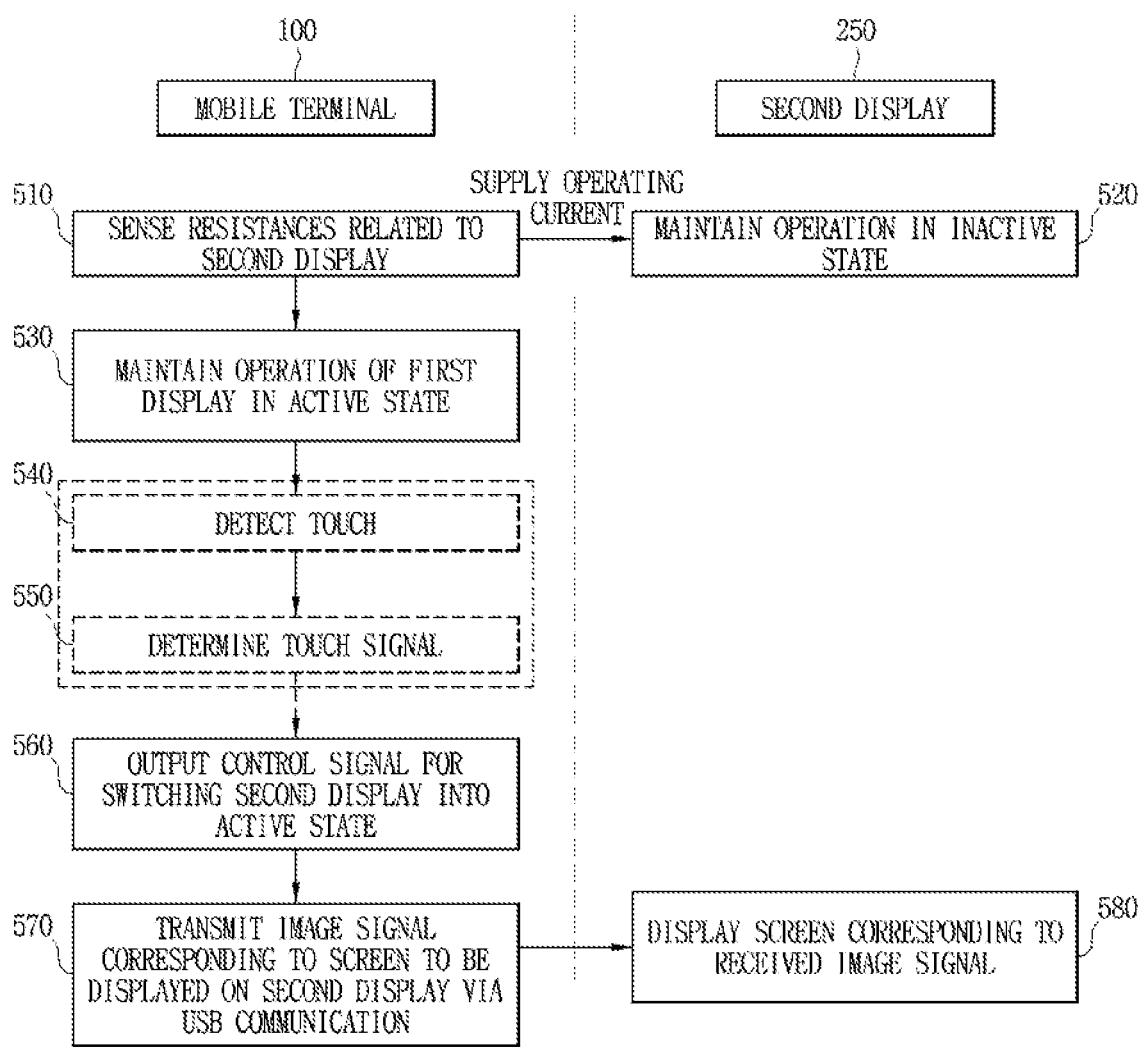
FIG. 5 is a flowchart for explaining a control method between a mobile terminal and a display provided in a case in an electronic device according to an embodiment.

Hereinafter, a control method between the mobile terminal and the display provided in the case will be described in more detail with reference to the accompanying drawings, based on the above descriptions. FIG. 5 is a representative flowchart illustrating a method for controlling between a mobile terminal and a display provided on a case in an electronic device according to an embodiment.

As described above, in an electronic device 300 according to the embodiment, when the mobile terminal 100 is coupled to the case 200, the mobile terminal 100 can sense a resistance corresponding to the second display 250 (510).

Specifically, when the connection port of the mobile terminal 100 is connected to the connector provided on one side of the case 200, the mobile terminal 100 may recognize a plurality of resistances provided with the connector to determine whether to supply an operating current to the second display 250.

When the plurality of resistances is recognized, an operating current is supplied from the mobile terminal 100 to the second display 250 through the connector, and the second display 250 can maintain an operation in the inactive state (520).

Specifically, when the plurality of resistances is recognized, the mobile terminal 100 operates in a host mode to supply the action current to the connector in a downstream manner. That is, the connection port of the mobile terminal 100 is switched to be a downstream facing port (DFP) to supply an operating current to the contact pin. For example, an operating current is supplied in a form of Vconn power through the CC1 pin among the contact pins of the connector.

In this case, the second display 250 on the case 200 side operates in a device mode to receive the action current in an upstream manner. That is, the connector of the case 200 is operated as an upstream facing port (UFP).

As described above, the operating current supplied through the CC1 pin of the connector is supplied to the circuit board 244 or the likes of the second display 250 through the wiring portion 242 coupled to the first and second flexible printed circuit boards 247, 248 as described above. In addition, an operating current is also supplied to the power supply unit 291 of the second display 250.

Meanwhile, as described above, the electronic device 300 may be either in an open state and a closed state, and when a transition from the closed state to the open state is detected, the first display 151 provided in the mobile terminal may maintain the operation in the active state (530). At this time, the transition from the closed state to the open state may be detected by recognizing a sensing value of the illuminance sensor provided on the front side of the mobile terminal 100, for example.

Alternatively, even when the connection port of the mobile terminal 100 is connected to the connector provided on one side of the case 200, and an input is applied to the first display 151 or the user input unit 123 in a state where the electronic device 300 is in the open state, the first display 151 may maintain the operation in the active state.

As described above, when a preset touch input is applied to the first display 151 while the second display 250 is maintained in the inactive state, the mobile terminal detects such a touch (540), and determines a touch signal corresponding to the detected touch (550).

When the touch signal is for switching the second display 250 into active state as a result of the determination, the controller of the mobile terminal may output a control signal for switching the second display 250 into the active state (560).

As another example, when a transition of the electronic device 300 from the closed state to the open state is detected and accordingly the first display 151 provided in the mobile terminal is operated in active state, the second display 250 may be operated in a state switched from inactive state to active state after a predetermined time (e.g., 0.5 second to 1 second) has elapsed. That is, a screen of the second display 250 may be turned on. after a predetermined time has elapsed after a screen of the first display 151 was turned on.

In this case, the above-described steps 540 and 550 are omitted, a step of detecting whether the electronic device 300 is switched from the closed state to the open state may be added before performing the step of operating the first display 151 in active state (530).

Meanwhile, as another example, although not illustrated, when a preset touch input is applied to the second display 250 while the second display 250 is operating in inactive state, a control signal to switch the second display 250 to active state may be transmitted from the mobile terminal 100.

In this case, signal processing corresponding to the touch signal sensed by the second display 250 may be performed by the first signal processor 181 and the second signal processor 281 as described above.

Specifically, the mobile terminal 100 performs wired communication in an initial state by using the first USB communication, then when the mobile terminal 100 is connected to the connector of the case 200 and recognizes the plurality of resistances Ra, Rd corresponding to the second display 250, the mobile terminal 100 controls the operation corresponding to the touch by using the second USB communication connected only with the B side contact pins (e.g., B6 and B7).

Even when the second display 250 is deactivated, the touch sensor (or touch panel 252) provided in the second display 250 is operated in active state to sense a touch applied to the second display 250.

The sensed touch may be I2c converted through the first and second signal processors 181, 281. In addition, the sensed touch is transferred from the second display 250 to the mobile terminal 100 via the circuit board 244 provided on the second body of the case, the wiring portion 242 coupled with the first and second flexible printed circuit boards 247, 248, and the connector, that is, the second wired communication unit 243.

Then, the mobile terminal 100 determines the touch signal transmitted from the second display 250 as described above, and determines whether the touch signal corresponds to a preset touch input. Here, the preset touch input may refer to, for example, applying a plurality of tabs on the second display 250 in inactive state.

When the touch signal is determined to correspond to the preset touch input, the mobile terminal 100 may perform the process of step 560 described above. That is, a control signal to switch the second display 250 to active state is output by the controller of the mobile terminal 100 and may be transmitted to the second display 250.

Thereafter, the mobile terminal 100 may transmit an image signal corresponding to a screen to be displayed on the second display 250 via USB communication (570).

To this end, the first and second wired communication units 161, 243 transmit, for example, the DP format image signal through a USB SS PHY pin. Specifically, the DP type image signal passes through the wiring portion 242 coupled with the first and second flexible printed circuit boards 247, 248 after passing through the first wired communication unit 161 and the second wired communication unit 243 interconnected to each other, is converted to MIPI format by the data converter 282 of the second display 250, and is transferred to the second display 250.

Next, the second display 250 may display a screen corresponding to the received signal, that is, an image signal converted to MIPI format (580). Here, a type of the screen displayed on the second display 250 is not particularly limited. For example, it may be a home screen page different from a home screen page displayed on the first display 151 or an execution screen of a preset application.

Hereinafter, a flow process of an operation according to the embodiment described above will be described in detail with reference to FIGS. 6A to 6D in connection with the allocation of a memory stack.

Figure 6A:
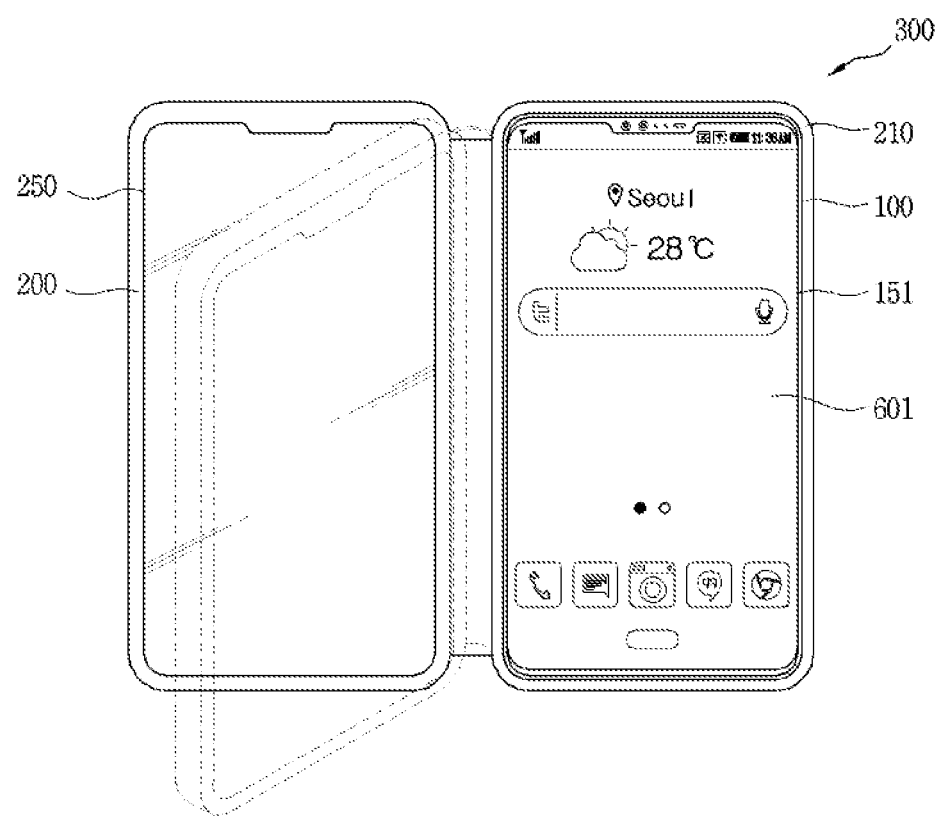
FIGS. 6A, 6B, 6C, and 6D are conceptual views for explaining control between a plurality of displays and a memory control method based thereon according to an embodiment.

Firstly, FIG. 6A illustrates a state in which the connection port of the mobile terminal is connected to the connector of the case, the first display 151 maintains the active state while the electronic device 300 is open, and the second display 250 on the case 200 side is in inactive state in the electronic device 300 according to the embodiment.

When the connection port of the mobile terminal is connected to the connector of the case to sense a plurality of resistances corresponding to the second display 250, an operating current is supplied to the second display 250 and the circuit board 244 of the case through the first wired communication unit 161, the second wired communication unit 243, and the wiring portion 242.

First screen information may be displayed on the activated first display 151. Here, a type of the first screen information is not limited. For example, the first screen information may be a first home screen page 601 as illustrated in FIG. 6A, and in other examples, the first screen information may be changed in various ways such as an execution screen of a specific application, a web page, a setting screen, etc. according to a setting or a selection of a user.

Figure 6B:
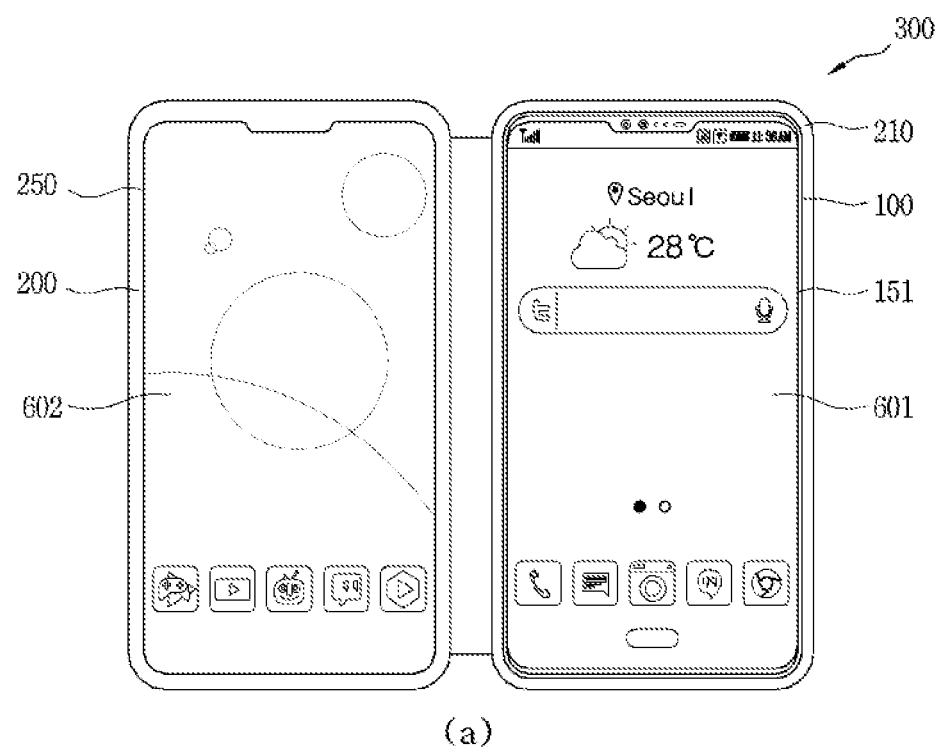
Figure 6B:
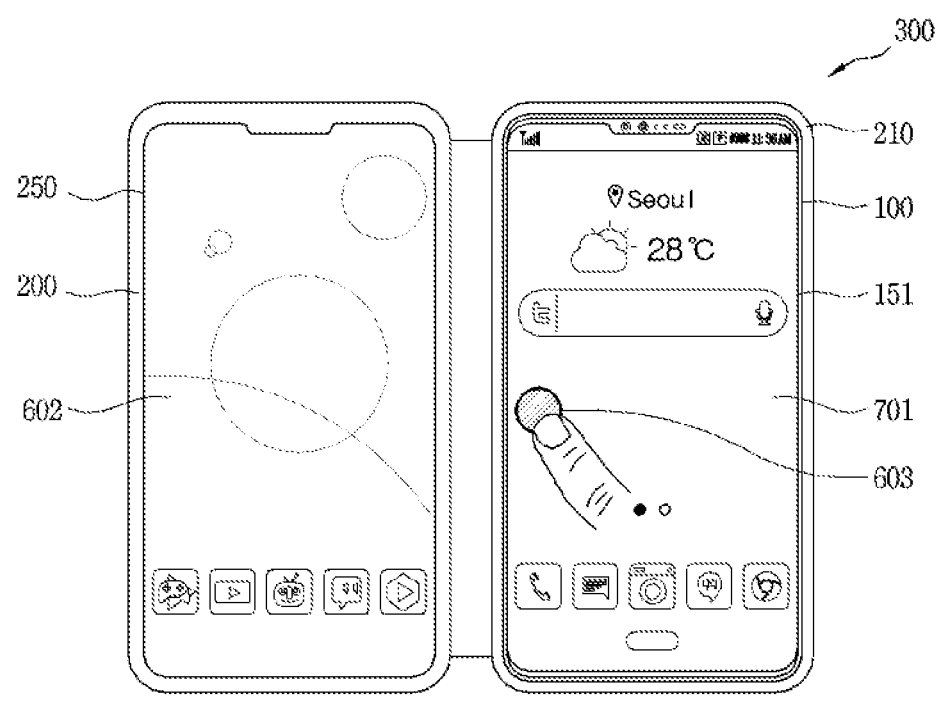
Figure 6C:
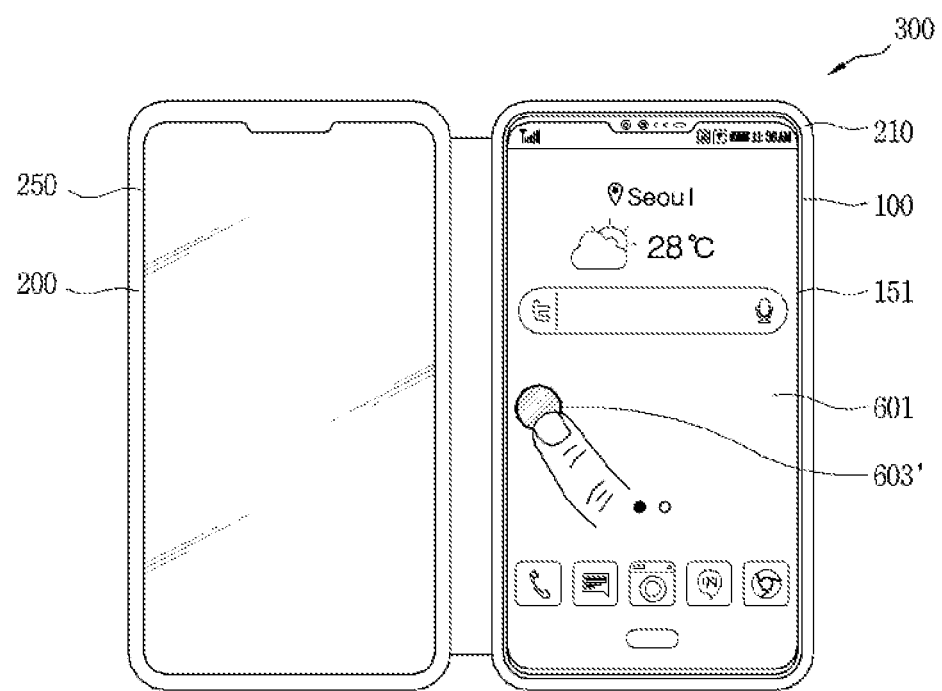
Figure 6D:
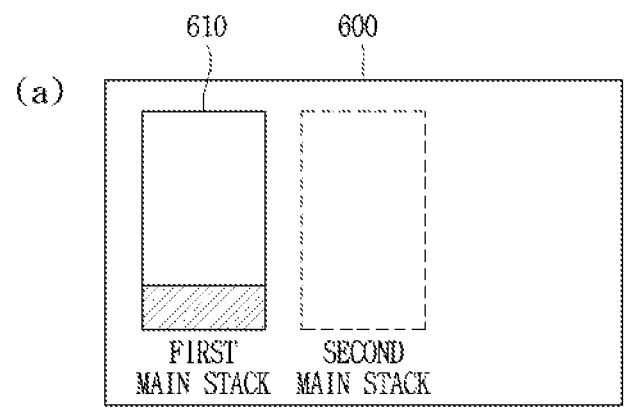
Figure 6D:
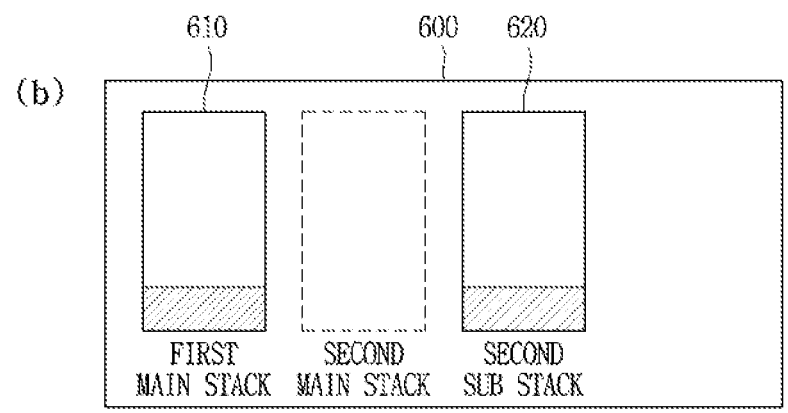
Figure 6D:
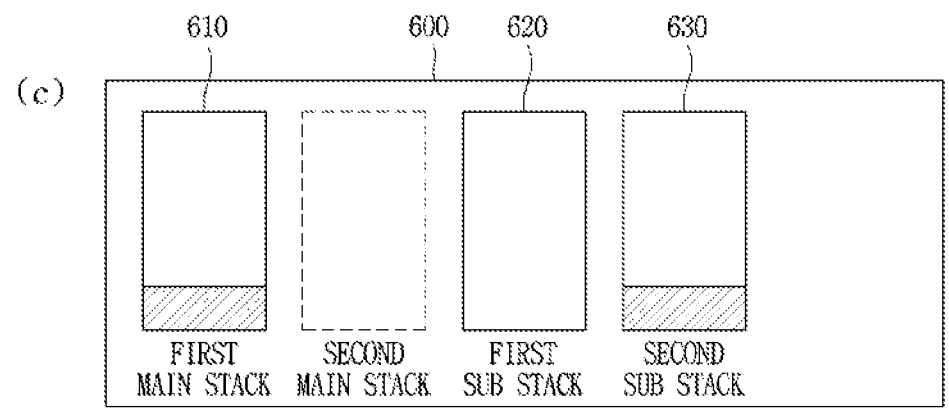

With respect to the first home screen page 601 being displayed on the first display 151 in active state, a main home stack 610 for the first display 151 may be allocated in a memory 600 of the mobile terminal 100, as illustrated in (a) of FIG. 6D. In addition, tasks related to the displaying of the first home screen page 601 may be stacked on the allocated main home stack 610.

Here, the stacking may be one of structures that stacks (PoP) data. A structure of stacking data may be of a stack type and a queue type. The stack has a data structure of first-in last-out, and the queue has a data structure of first-in first-out.

In the present disclosure, stacks for the first and second displays 151, 250 are separately allocated and removed depending on whether they are activated.

In the open state, the second display 250 in inactive state may be switched to active state when a predetermined time has elapsed after the first display 151 is operated in active state as illustrated in (a) of FIG. 6B, or when a predetermined touch input is applied to the first display 151, for example, to a specific icon as illustrated in (b) of FIG. 6B. Alternatively, although not illustrated, when a touch input is applied to the second display 250, the second display 250 may also be switched to active state.

First, referring to (a) of FIG. 6B, when the electronic device 300 is detected to be switched from the closed state to the open state while an operating current is supplied to the second display 250 according to sensing of a resistance related to the second display 250, and the first display 151 is operated in active state, a control signal to switch the second display 250 to active state may be transmitted to the second display 250. At this time, the control signal is generated by the mobile terminal 100, and transmitted to the circuit board 244 coupled with the second display 250 via the first and second wired communication units 161, 243, and the wiring portion 242.

In addition, the image signal corresponding to the screen to be displayed on the second display 250 is also transmitted to the circuit board 244 coupled with the second display 250 via the first and second wired communication units 161, 243, and the wiring portion 242, together with the control signal or sequentially after the transmission of the control signal. Here, the image signal is transmitted in DP format, converted into MIPI format that can be displayed on the second display 250 by the data converter 282, and provided to the second display 250.

Meanwhile, a condition of the open state for operating the first display 151 in active state and a condition of the open state for operating the second display 250 in active state may be different. For example, the open state in which the second display 250 is operated in active state may be limited to a state in which an angle between the first body 210 and the second body 220 is greater than that in the case of the first display 151.

For example, the first display 151 may be switched to active state when the electronic device 300 is detected to be in open state, and the second display 250 may be switched to active state when rear surfaces of the first and second bodies 210, 220 are relatively rotated to be closer to each other after the first display 151 is switched to active state.

Here, in the open state, the angle between the first and second displays 151, 250 to switch the second display 250 to an active state may be preset or changed by a user.

In addition, a setting of whether to switch the second display 250 to active state sequentially after the first display 151 is switched to active state may be on/off based on user input.

Next, referring to (b) of FIG. 6B, when a preset touch input (e.g., touch input applied to a predetermined icon 603 or multi-finger touch gesture) is applied to the first display 151 while an operating current is supplied to the second display 250, an action corresponding to the touch input, that is, a control signal to switch the second display to the active state may be transmitted to the mobile terminal 100 via USB HID communication.

At this time, since the control signal is a signal related to the touch, the control signal is transmitted to the mobile terminal 100 through the first signal processor 181 and the second signal processor 281 using USB HID communication.

Meanwhile, referring to FIG. 6C, when a preset touch input (e.g., touch input applied to the predetermined icon 603 or multi-finger touch gesture) is again applied to the first display 151 while the second display 250 is operated in active state, the second display 250 is switched to inactive state.

To this end, a control signal corresponding to the touch signal of the preset touch input and to switch the second display 250 into inactive state is transmitted from the mobile terminal 100 to the display 250 using USB communication. Accordingly, the second display 250 is switched back to the inactive state, and the transmission of the image signal from the mobile terminal is stopped.

Meanwhile, as another example, when a preset touch input (e.g., double tap) is applied to the second display while an operating current is supplied to the second display 250, a touch signal corresponding to the preset touch input is transmitted to the mobile terminal 100 via the circuit board 244 connected to the touch panel, the wiring portion 242 coupled with the first and second flexible printed circuit boards 247, 248, and the first and second signal processors 181, 281 using USB HID communication.

Then, the controller 180 of the mobile terminal 100 transmits a control signal to activate the second display 250 to the circuit board coupled with the second screen 251 and the second display 250 via the connector connected with the connection port of the mobile terminal, based on the transmitted touch signal. At this time, since the control signal is a signal related to the touch, the control signal is transmitted to the mobile terminal 100 through the first signal processor 181 and the second signal processor 281 using USB HID communication.

Here, the signal related to the touch is initially transmitted and received through USB 2.0 communication (hereinafter, referred to as 'first USB communication'), then transmitted and received through the switched USB HID communication (hereinafter, referred to as 'second USB communication') when the mobile terminal 100 is operated in the host mode (i.e., when resistances Ra, Rd are sensed).

In addition, the control signal is transmitted to the second display 250 through the first wired communication unit 161, the second wired communication unit 243, and the wiring unit 240 in AUX format. The control signal in the AUX format is transmitted to the second display 250 via the second data converter 282.

As described above, when the second display 250 is switched to active state, second screen information, for example, a second home screen page may be displayed on the second display 250.

To this end, the image signal corresponding to the screen to be displayed on the second display 250 is transmitted to the circuit board 244 coupled with the second display 250 via the first and second wired communication units 161, 243, and the wiring portion 242. Here, the image signal is transmitted in DP format, converted into MIPI format that can be displayed on the second display 250 by the data converter 282, and provided to the second display 250.

Meanwhile, a control signal to switch the second display 250 to active state and the image signal corresponding to the screen to be displayed on the second display 250 are transmitted through different contact pins in the first wired communication unit 161 and the second wired communication unit 243.

With respect to the first home screen page 601 being displayed on the active first display 151, referring to (b) of FIG. 6D, a sub home stack 620 for the second display 250 in addition to the main home stack 610 for the first display 151 is allocated in the memory 600.

At this time, tasks related to the DP format image signal transmitted to the circuit board 244 coupled with the second display 250 via the first wired communication unit 161, the second wired communication unit 243, and the wiring portion 242 is stacked on the sub home stack 620.

The main home stack 610 and the sub home stack 620 are independently controlled, and when a task corresponding to a specific application is executed on the second display 250, a sub-app stack 630 is additionally allocated to the memory and the task corresponding to the specific application is stacked as illustrated in (c) of FIG. 6D.

The controller 180 of the mobile terminal may transmit the DP format image signal corresponding to the task stacked on the sub-app stack 630 to the second display 250 via the circuit board 244 coupled with the second display 250 via the first wired communication unit 161, the second wired communication unit 243, and the wiring portion 242.

Here, the image signal in the DP format is converted into MIPI format by the second data converter 282 so that it can be displayed on the second display 250, and then transmitted to the second display 250. Accordingly, screen information corresponding to the task stacked on the sub-app stack 630 is displayed on the second display 250.

As described above, in the electronic device 300 according to the embodiment, a control signal transmitted to the circuit board connected to the second display 250 and an image signal corresponding to screen information to be displayed on the second display 250 are transmitted through different contact pins.

Meanwhile, as illustrated in FIG. 6C, when the second display 250 is deactivated, the sub-stacks (e.g., sub home stack and sub-app stack) allocated to the memory are deleted from the memory.

Meanwhile, although not illustrated, when the connection port of the mobile terminal and the connector of the case are disconnected so that the wired communication path of the first wired communication unit 161 and the second wired communication unit 243 is released while the second display 250 is activated, supply of operation current is cut off, and the second display 250 is switched to inactive state.

Here, when the connection port of the mobile terminal and the connector of the case are connected again, the second display 250 is switched back to active state, and the screen information displayed on the second display 250 before the connection is cut off may be output again.

Hereinafter, a connection relationship and an audio framework between a first display and a second display and a first audio device and a second audio device according to an embodiment will be described with reference to FIG. 7.

Figure 7:
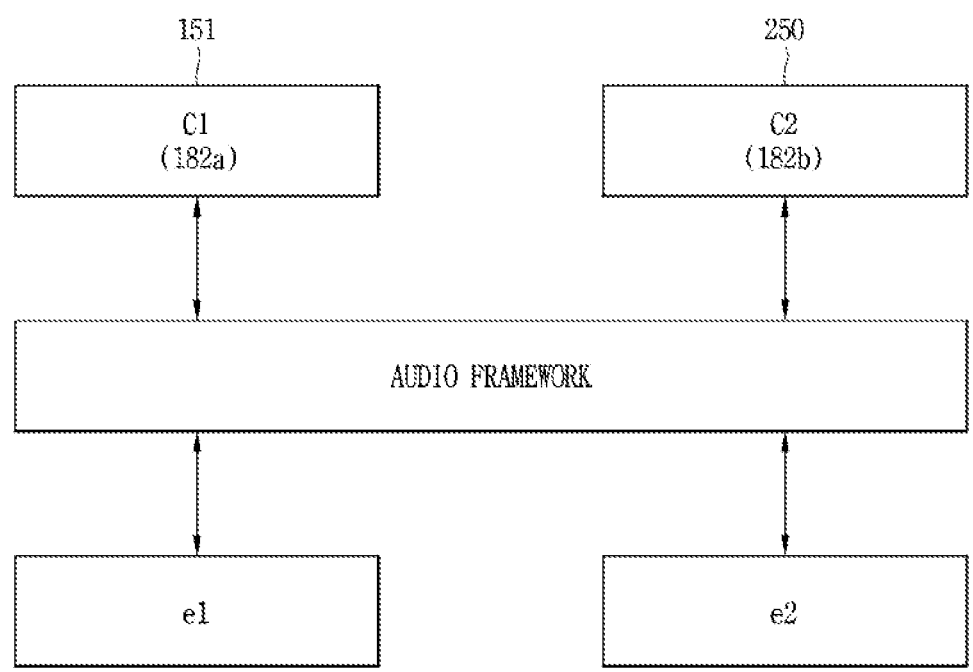
FIG. 7 is a block diagram showing a connection relationship between a first display and a second display, and a first audio device and a second audio device, respectively, according to an embodiment.

FIG. 7 is a block diagram showing a connection relationship between a first display and a second display, and a first audio device and a second audio device, respectively, according to an embodiment.

The interface unit 160 may be connected to a plurality of audio devices through a Bluetooth port or the like. The plurality of audio devices may include a first audio device e1 and a second audio device e2.

Each of the first audio device e1 and the second audio device e2 may output a sound of content displayed on a display corresponding thereto.

The controller 180 matches the first audio device e1 and the second audio device e2 to the first display 151 and the second display 250, respectively.

Specifically, the controller 180 matches the first audio device e1 to the first display 151 using a display ID (DisplayID, hereinafter referred to as a first display ID) of the first display 151.

The controller 180 matches the second audio device e2 to the second display 250 using a display ID (DisplayID, hereinafter referred to as a second display ID) of the second display 250.

For convenience of explanation, it has been described that the controller 180 matches two audio devices to two displays, but the embodiment is not limited thereto, and the controller 180 may match two or more audio devices to two or more displays.

An operating system (OS) (not shown) of the mobile terminal 100 is installed in the controller 180. A plurality of applications (e.g., a music playback application, a video playback application, a television application, etc.) installed in the mobile terminal 100 may be simultaneously executed.

The plurality of applications may include a first application 182a and a second application 182b. The first application 182a and the second application 182b may be simultaneously executed.

When the first application 182a and the second application 182b are simultaneously executed, content C1 of the first application 182a may be displayed on the first display 151 and content C2 of the second application 182b on the second display 250, but the embodiment is not limited thereto.

The operating system (OS) includes an audio framework that controls a sound output of the application.

The audio framework may control the first audio device e1 and the second audio device e2 to disallow a sound of the first application 182a and a sound of the second application 182b to overlap each other among the plurality of applications being simultaneously executed.

That is, the sounds of the plurality of applications being simultaneously executed can be individually output using one audio framework.

A description of a specific method of allowing the audio framework to control the first audio device e1 and the second audio device e2 by separating the sounds of the first application 182a and the second application 182b, respectively, to output the sounds corresponding the first audio device e1 and the second audio device e2, respectively, will be omitted.

Hereinafter, a process in which the outputs of the displays and the audio devices are changed in response to a content exchange according to an embodiment will be described with reference to FIG. 8.

Figure 8:
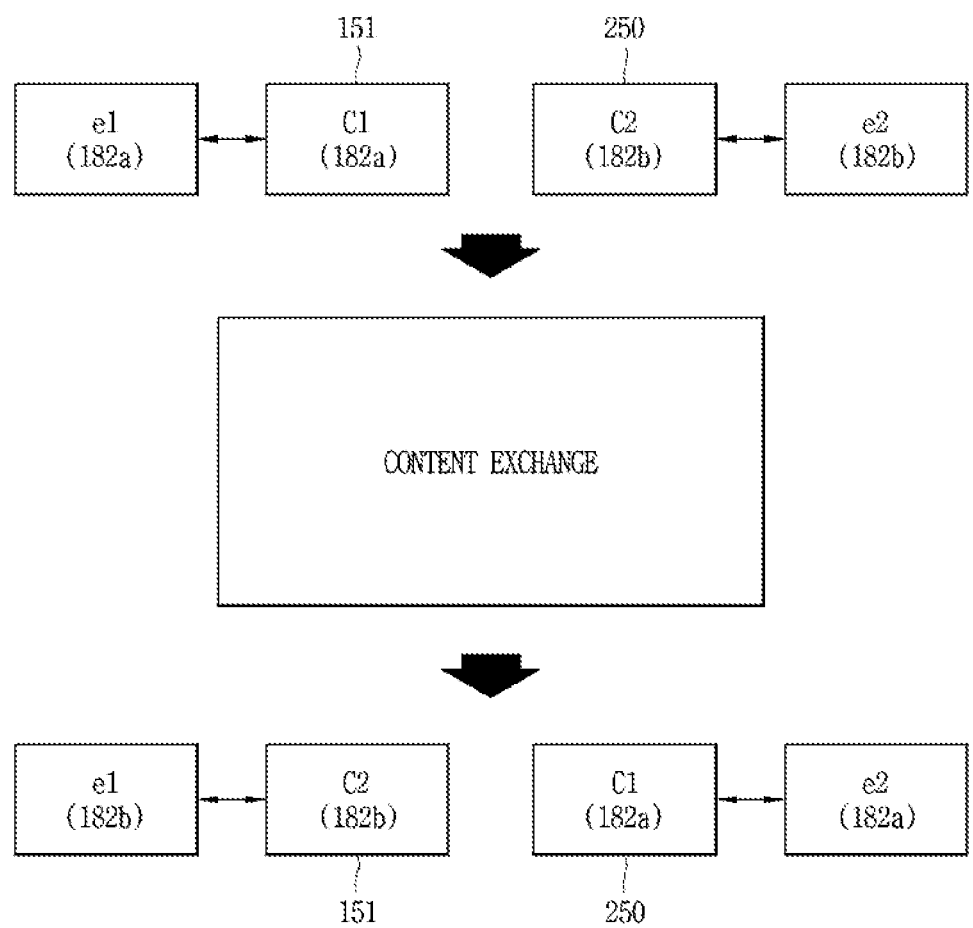
FIG. 8 is a block diagram showing a connection between a display and an audio device based on a content exchange according to an embodiment.

FIG. 8 is a block diagram showing a connection between a display and an audio device based on a content exchange according to an embodiment.

Referring to FIG. 8, the first application 182a and the second application 182b may be executed. The content C1 of the first application 182a may be displayed on the first display 151, and the sound of the first application 182a may be output to the first audio device e1. The content C2 of the second application 182*b* may be displayed on the second display 250, and the sound of the second application 182*b* may be output to the second audio device e2.

After a screen of the content C1 and a screen of the content C2 are exchanged (hereinafter referred to as an exchange between the content C1 and the content C2), the content C2 of the second application 182*b* may be displayed on the first display 151, and the sound of the first application 182*a* may be output to the first audio device e1. The content C2 of the second application 182*b* may be displayed on the second display 250, and the sound of the second application 182*b* may be output to the second audio device e2.

In this specification, a screen exchange denotes that the screen of the content C1 is exchanged with the screen of the content C2. A detailed method of exchanging the screens with each other will be described in detail below.

That is, even when the content C1 is exchanged with the content C2, a matching between the first display 151 and the first audio device e1 is maintained and a matching between the second display 250 and the second audio device e2 is maintained.

Hereinafter, content screens displayed on the first display 151 and the second display 250, and audio devices matching the first display 151 and the second display 250, respectively, will be described in detail.

Figure 9A:
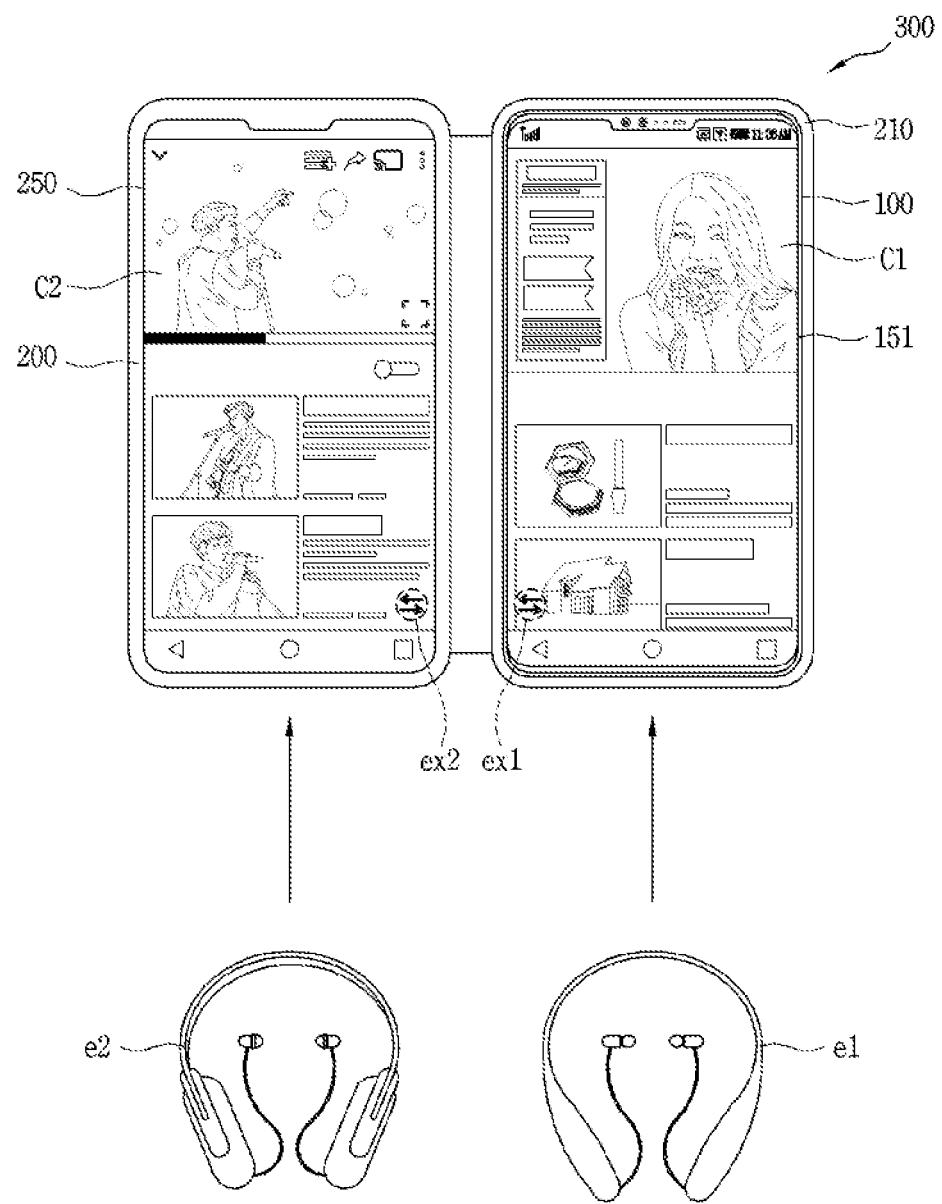
FIG. 9A is a view showing content items played on a first display and a second display and audio devices connected to individual displays according to an embodiment.

FIG. 9A is a view showing content items played on a first display and a second display and audio devices connected to individual displays according to an embodiment.

Referring to FIG. 9A, as the first application 182*a* (e.g., see FIG. 8) and the second application 182*b* (see FIG. 8) are executed, the first application content C1 is displayed on the first display 151 and the second application content C2 may be displayed on the second display 250.

For example, the first display 151 may be matched to the first audio device e1 and the second display 250 may be matched to the second audio device e2.

The first audio device e1 may output a sound (e.g., music, voice, etc.) of the first content C1 displayed on the first display 151.

Furthermore, the controller 180 matches the second audio device e2 to the second display 250 using a display ID (hereinafter referred to as a second display ID) of the second display 250. The second audio device e2 may output the sound of the second content C2 displayed on the second display 250.

A first audio device e1 or a second audio device e2 may be a Bluetooth earphone set, a Bluetooth headset, a Bluetooth speaker, a speaker built in the electronic device 300, or the like, but the embodiment is not limited thereto, and may include any audio device connected thereto in a wired and/or wireless manner through the interface unit 160 to output sound.

Hereinafter, a method of exchanging the content of the first display 151 with the screen of the second display 250 according to an embodiment will be described with reference to FIG. 9B.

Figure 9B:
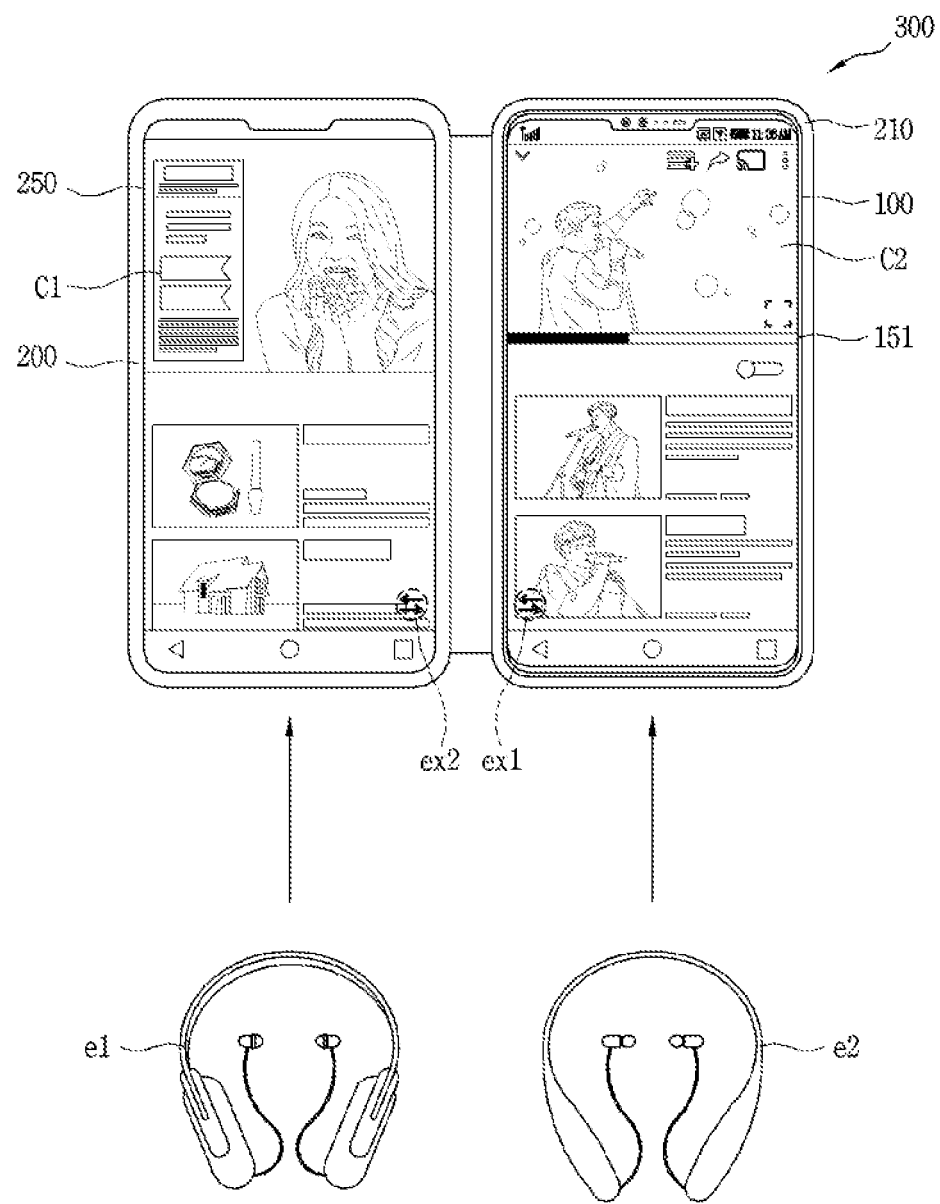
FIG. 9B is a view showing content items played on a first display and a second display and audio devices connected to individual displays based on a screen exchange according to an embodiment.

FIG. 9B is a view showing content items played on a first display and a second display and audio devices connected to individual displays based on a content exchange according to an embodiment.

As described with reference to FIG. 9A, the first content C1 is displayed on the first display 151 and the second content C2 is displayed on the second display 250. In this case, the screens displayed on the first display 151 and the second display 250 may be exchanged with each other according to a predetermined operation of the user.

For example, according to a first direction drag on the first display 151, the first content C1 is displayed on the second display 250 and the second content C2 is displayed on the first display 151.

Furthermore, according to a second direction drag on the second display 250, the second content C2 may be displayed on the first display 151 and the first content C1 may be displayed on the second display 250.

That is, according to the first direction drag or the second direction drag, the first content C1 and the second content C2 may be displayed interchangeably. In this case, the first direction drag is a drag from the first display 151 toward the second display 250, and the second direction drag is a drag from the second display 250 toward the first display 151, but the embodiment is not limited thereto.

In addition, a first exchange icon ex1 may be displayed on the first display 151 and a second exchange icon ex2 may be displayed on the first display 250.

According to a touch of the first exchange icon ex1 or a touch of the second exchange icon ex2, displays on which the first content C1 and the second content C2 are displayed may be exchanged with each other.

Specifically, according to a touch of the first exchange icon ex1, the first content C1 may be displayed on the second display 250 and the second content C2 may be displayed on the first display 151. According to a touch of the second exchange icon ex2, the second content C2 may be displayed on the first display 151 and the first content C1 may be displayed on the second display 250.

Hereinafter, an example in which a plurality of content items are displayed on a plurality of displays and a plurality of audio devices will be described with reference to FIGS. 10A to 10C.

Figure 10A:
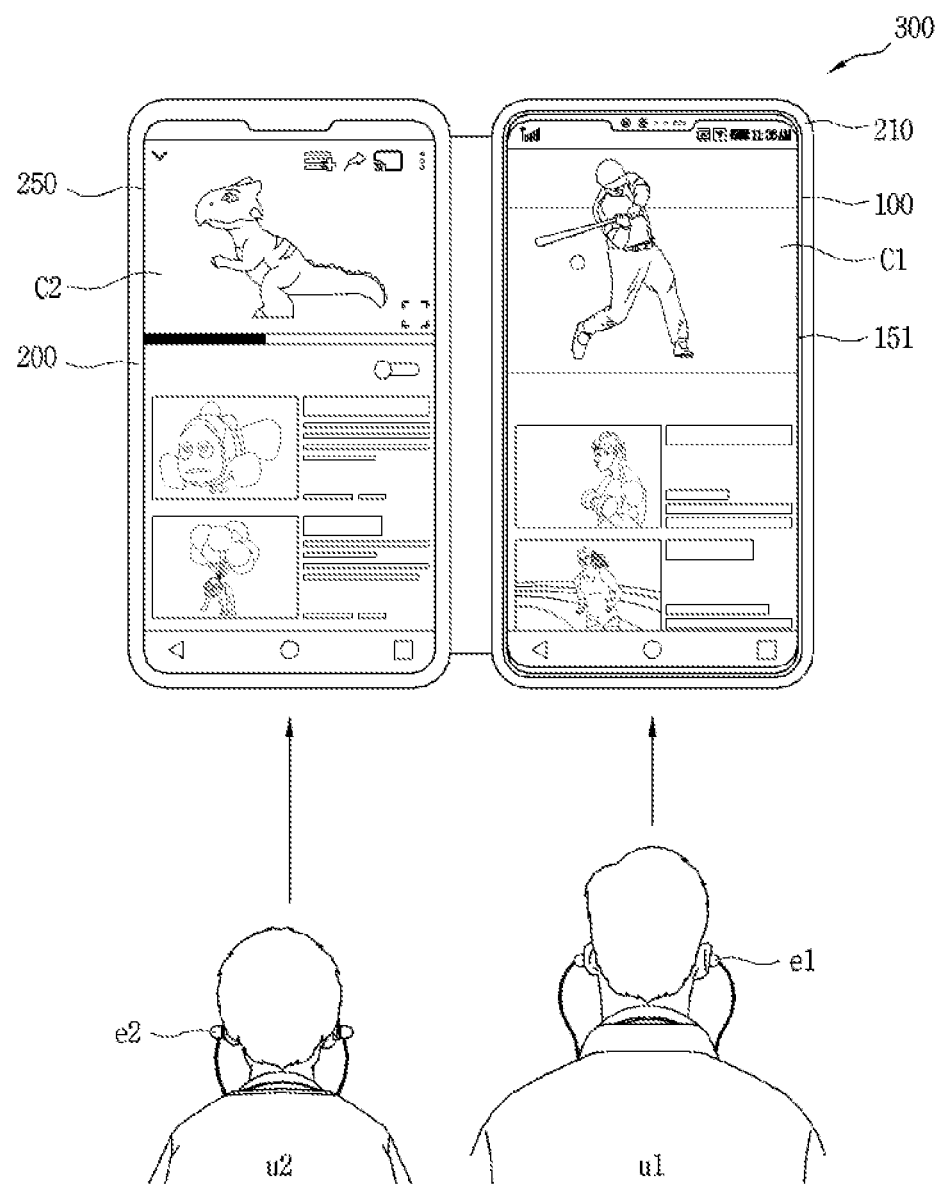
FIGS. 10A to 10C are views showing examples in which various content items are displayed on a plurality of displays according to an embodiment.
Figure 10B:
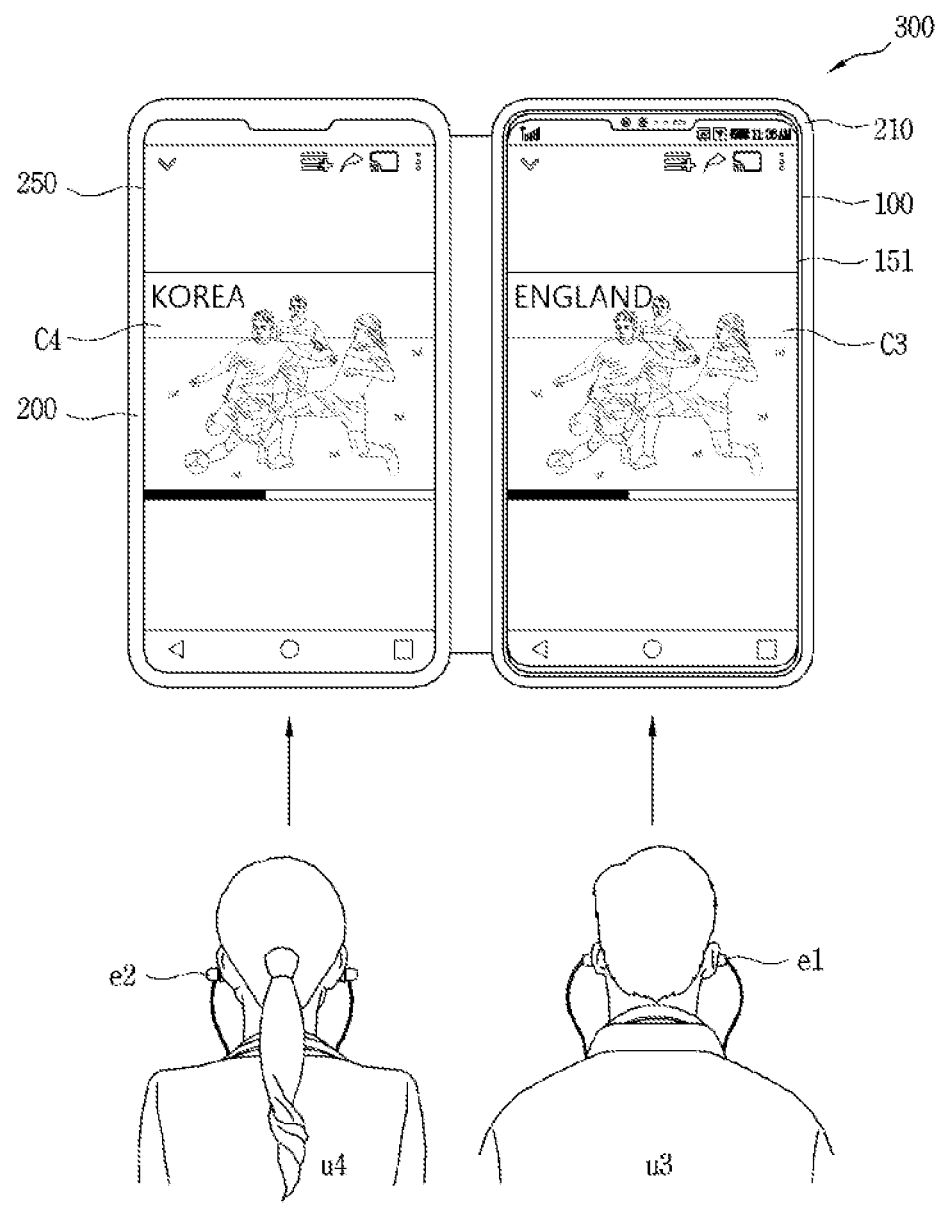
Figure 10C:
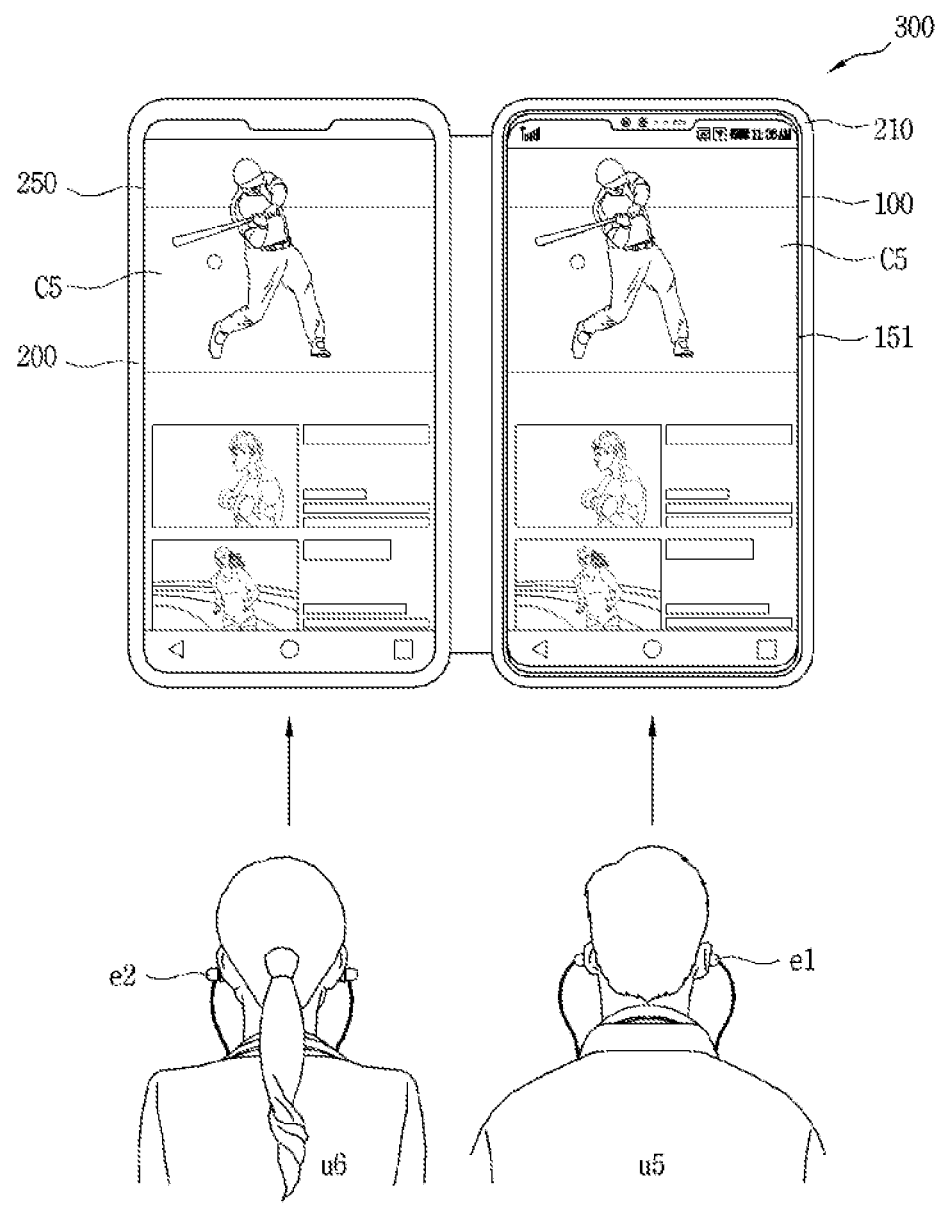

FIGS. 10A to 10C are views showing examples in which various content items are displayed on a plurality of displays according to an embodiment.

Referring to FIG. 10A, a first application and a second application are simultaneously executed in the mobile terminal 100. Correspondingly, the first content C1 (e.g., sports content) is displayed on the first display 151 and the second content C2 (e.g., children content) is displayed on the second display 250. Furthermore, the sound of the first content C1 is output to the first audio device e1 and the sound of the second content C2 is output to the second audio device e2.

That is, independently through the single mobile terminal 100, a first user u1 may view and listen to a screen and sound corresponding to sports content, and a second user u2 may watch children content.

In addition, even in an embodiment according to FIG. 10A, when sports content is exchanged with children content, as described with reference to FIG. 8, the first user u1 may independently watch the children content, and the second user u2 may watch the sports content.

Accordingly, according to the embodiment, there is an effect that content items can be easily exchanged and viewed together with the other party only by exchanging the sports content with the children content without exchanging audio devices.

Referring to FIG. 10B, a first application and a second application are simultaneously executed in the mobile terminal 100. Correspondingly, third content C3 (e.g., soccer match on UK relay broadcast content) is displayed on the first display 151 and fourth content C4 (e.g., soccer match on Korean relay broadcast content) is displayed on the second display 250. Furthermore, a sound of the third content C3 is output to the first audio device e1 and a sound of the fourth content C4 is output to the second audio device e2.

That is, independently through the single mobile terminal 100, a third user u3 may watch a soccer match on UK relay broadcast, and a fourth user u4 may watch a soccer match on Korean relay broadcast.

In addition, even in an embodiment according to FIG. 10B, when the soccer match on UK broadcast content is exchanged with the soccer game on Korean relay broadcasting content are exchanged, as described with reference to FIG. 8, independently, the third user u3 may watch the soccer game on Korea relay broadcast, and the fourth user u4 may watch the soccer match on UK relay broadcast.

Therefore, according to the embodiment, there is an effect that content items can be easily exchanged and viewed together with the other party only by exchanging the soccer match on UK relay broadcast content with the soccer match on Korean relay broadcast content without exchanging audio devices.

Referring to FIG. 10C, the first application is executed in the mobile terminal 100. Correspondingly, fifth content C5 (e.g., baseball game content) is displayed on the first display 151, and the fifth content C5 is also displayed on the second display 250. Furthermore, a sound of the fifth content C5 is output to the first audio device e1 and the sound of the fifth content C5 is also output to the second audio device e2.

That is, through the single mobile terminal 100, a fifth user u5 and a sixth user u6 may simultaneously watch the baseball game.

Hereinafter, a method of matching an audio device to another display connected wirelessly by the electronic device 300 according to another embodiment will be described with reference to FIG. 11.

Figure 11:
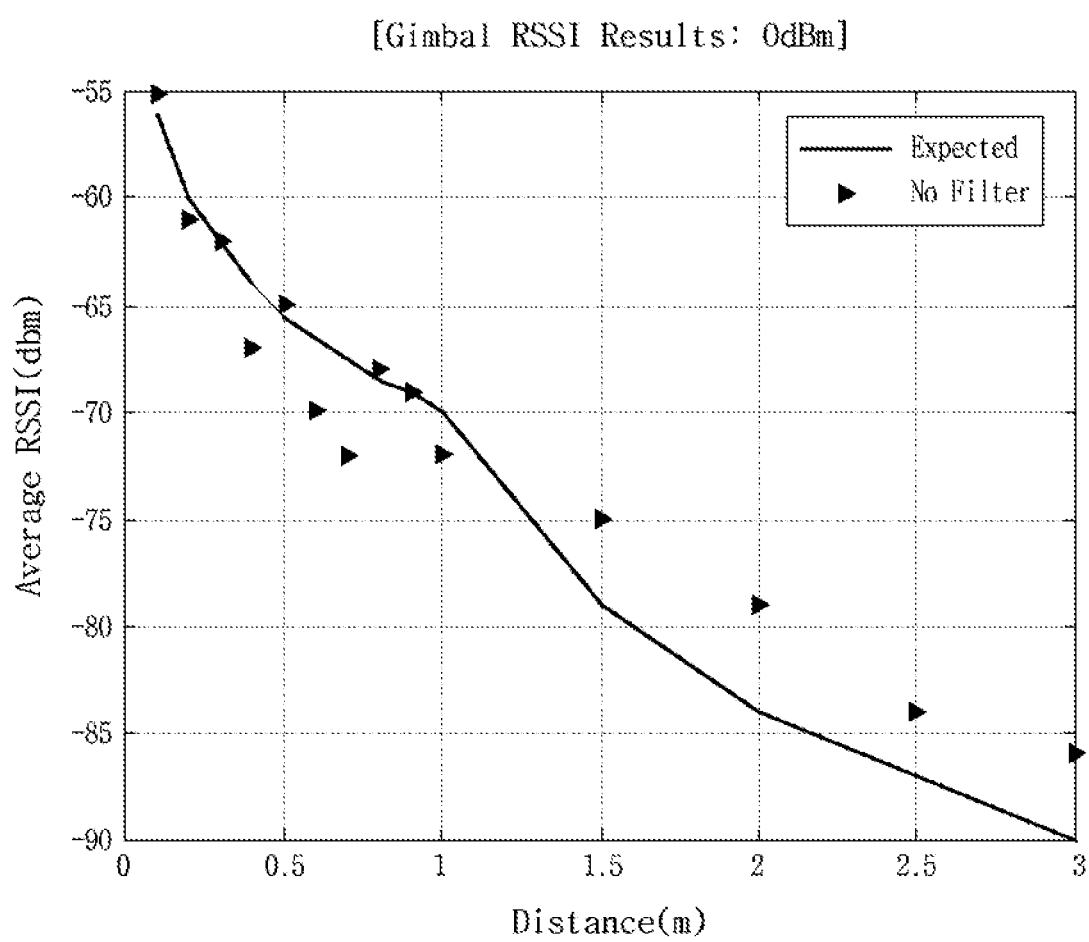
FIG. 11 is a graph showing a RSSI signal strength based on a distance between a mobile terminal and another display when the mobile terminal and the other display are wirelessly connected according to another embodiment.

FIG. 11 is a graph showing a RSSI signal strength based on a distance between a mobile terminal and another display when the mobile terminal and the other display are wirelessly connected according to another embodiment.

Referring to FIG. 11, it is shown that a distance between the mobile terminal 100 and a third or fourth display is inversely proportional to an average value of the RSSI signal (average RSSI).

The interface unit 160 may wirelessly connect the mobile terminal 100 to a third display 350 (see FIG. 13A) or a fourth display 450 (see FIG. 13B) using a Bluetooth port. The interface unit 160 may measure a RSSI signal strength between the mobile terminal 100 and the third display 350 or the fourth display 450.

The interface unit 160 may calculate a distance between the mobile terminal 100 and the third display 350 or the fourth display 450 based on the RSSI signal strength.

Based on a distance between the mobile terminal 100 and the third display 350 or the fourth display 450, the interface unit 160 wirelessly connects a nearby display in which the distance between the mobile terminal 100 and the third display 350 or the fourth display 450 is included in a reference range (e.g., within a radius of 1 m from the mobile terminal 100).

The controller 180 may calculate a distance between the mobile terminal 100 and the third display 350 or the fourth display 450 in proportion to the RSSI signal strength between the mobile terminal 100 and the third display 350 or the fourth display 450.

The controller 180 may determine to exchange the positions of the mobile terminal 100 and the third display 350 based on the RSSI signal strength between the mobile terminal 100 and the third display 350 or the fourth display 450.

For example, when the mobile terminal 100 and the third display 350 are connected, and then a distance between the mobile terminal 100 and the third display 350 decreases and then increases in a first direction for a predetermined period of time (e.g., several seconds) within a reference range, the controller 180 may determine that the positions of the mobile terminal 100 and the third display 350 have been exchanged. That is, the controller 180 may determine that the positions of the mobile terminal 100 and the third display 350 have been exchanged based on a reversal of the RSSI signal strength between the mobile terminal 100 and the third display 350 or the fourth display 450.

When it is determined that the positions of the mobile terminal 100 and the third display 350 have been exchanged, the controller 180 may exchange the content of the first display 151 or the second display 250 and the content of the third display 350.

Since a specific example in which the controller 180 exchanges the content of the first display 151 or the second display 250 and the content of the third display 350 is the same as the foregoing embodiment in which the content C1 and the content C2 are exchanged with each other with reference to FIG. 8, and thus a detailed description thereof will be omitted.

Furthermore, allowing the controller 180 to determine that the positions of the mobile terminal 100 and the fourth display 450 has been exchanged is the same as allowing the controller 180 to determine that the positions of the mobile terminal 100 and the third display 350 has been exchanged as described above, and thus a detailed description thereof will be omitted.

In addition, a specific example in which the controller 180 exchanges the content of the first display 151 or the second display 250 with the content of the fourth display 450 is the same as the foregoing embodiment in which the content C1 and the content C2 are exchanged with each other, and thus a detailed description thereof will be omitted.

Moreover, a method of allowing the controller 180 to match the mobile terminal 100 to an audio device corresponding to the third display 350 or the fourth display 450 is the same as a method of matching a first audio device and a second audio device to a first display and a second display, respectively, with reference to FIG. 7, and thus a detailed description thereof will be omitted.

Hereinafter, a motion detected by a sensor unit when a mobile terminal according to another embodiment and another display are wireless connected will be described with reference to FIG. 12.

Figure 12:
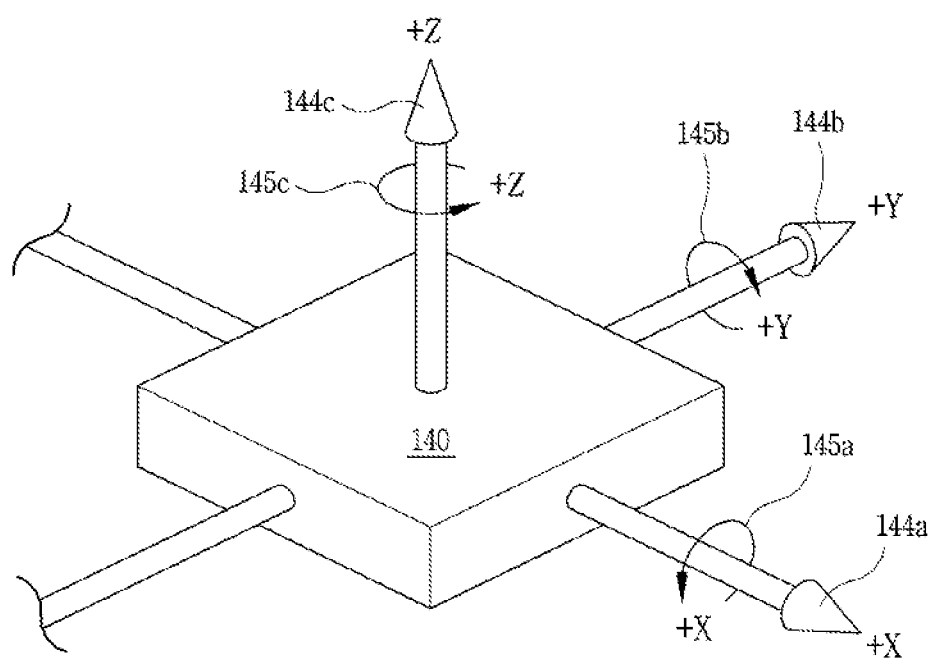
FIG. 12 is a view showing a motion detected by a sensor unit when a mobile terminal and another display are wirelessly connected to each other according to another embodiment.

FIG. 12 is a view showing a motion sensed by a sensor unit when a mobile terminal and another display are wirelessly connected to each other according to another embodiment.

The sensing unit 140 may include an acceleration sensor (not shown) and a gyroscope sensor (not shown) to detect a motion of the mobile terminal 100.

Referring to FIG. 12, the sensing unit 140 may detect an acceleration 144a in a first direction (e.g., an x-direction). The sensing unit 140 may detect an acceleration 144b in a second direction (e.g., a y-direction). Furthermore, the sensing unit 140 may detect an acceleration 144c in a third direction (e.g., a z-direction).

The sensing unit 140 may detect an angular velocity 145a in the first direction (e.g., the x-direction). The sensing unit 140 may detect an angular velocity 145b in the second direction (e.g., the y-direction). In addition, the sensing unit 140 may sense an angular velocity 145c in a third direction (e.g., a z-direction).

The sensing unit 140 may detect a motion of the mobile terminal 100 using the detected acceleration and angular velocity. For example, using the detected acceleration and angular velocity, a direction-change motion (first motion), an upside-down motion (second motion), or a shaking motion (third motion) of the mobile terminal may be detected, but the embodiment is not limited thereto.

Each of the first to third motions may be any one of a motion in which an azimuth of the mobile terminal 100 changes, a pitching motion of the mobile terminal 100, and a rolling motion of the mobile terminal 100, but the embodiment is not limited thereto.

Figure 13A:
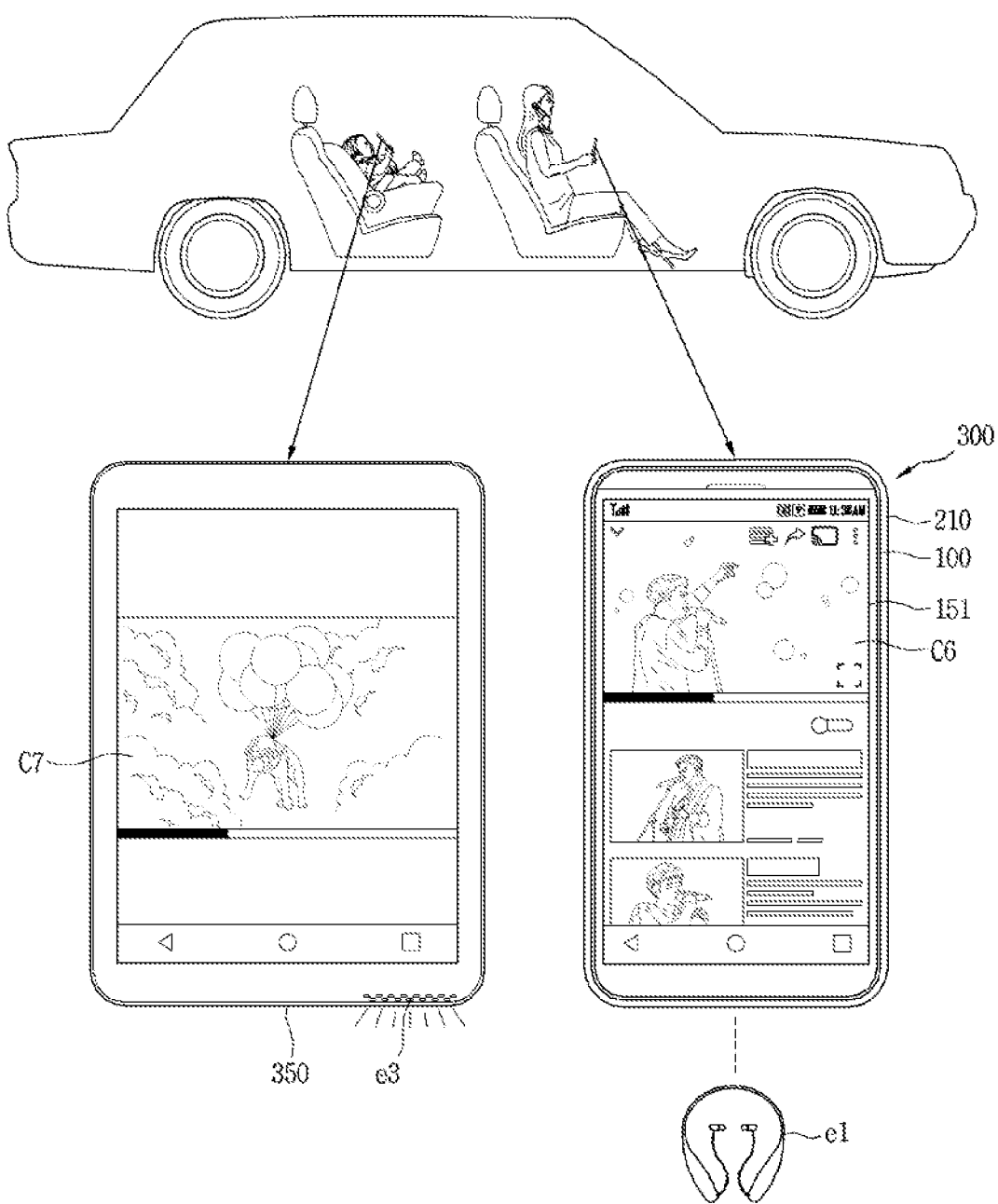
FIG. 13A is a view showing an example in which content items are displayed on a mobile terminal and a third display according to another embodiment.

According to any one of the first to third motions of the mobile terminal 100, the controller 180 may determine that the content C1 of the first display 151 or the content C2 of the second display 250 has been exchanged with the content of the third display 350 (see FIG. 13A).

Figure 13B:
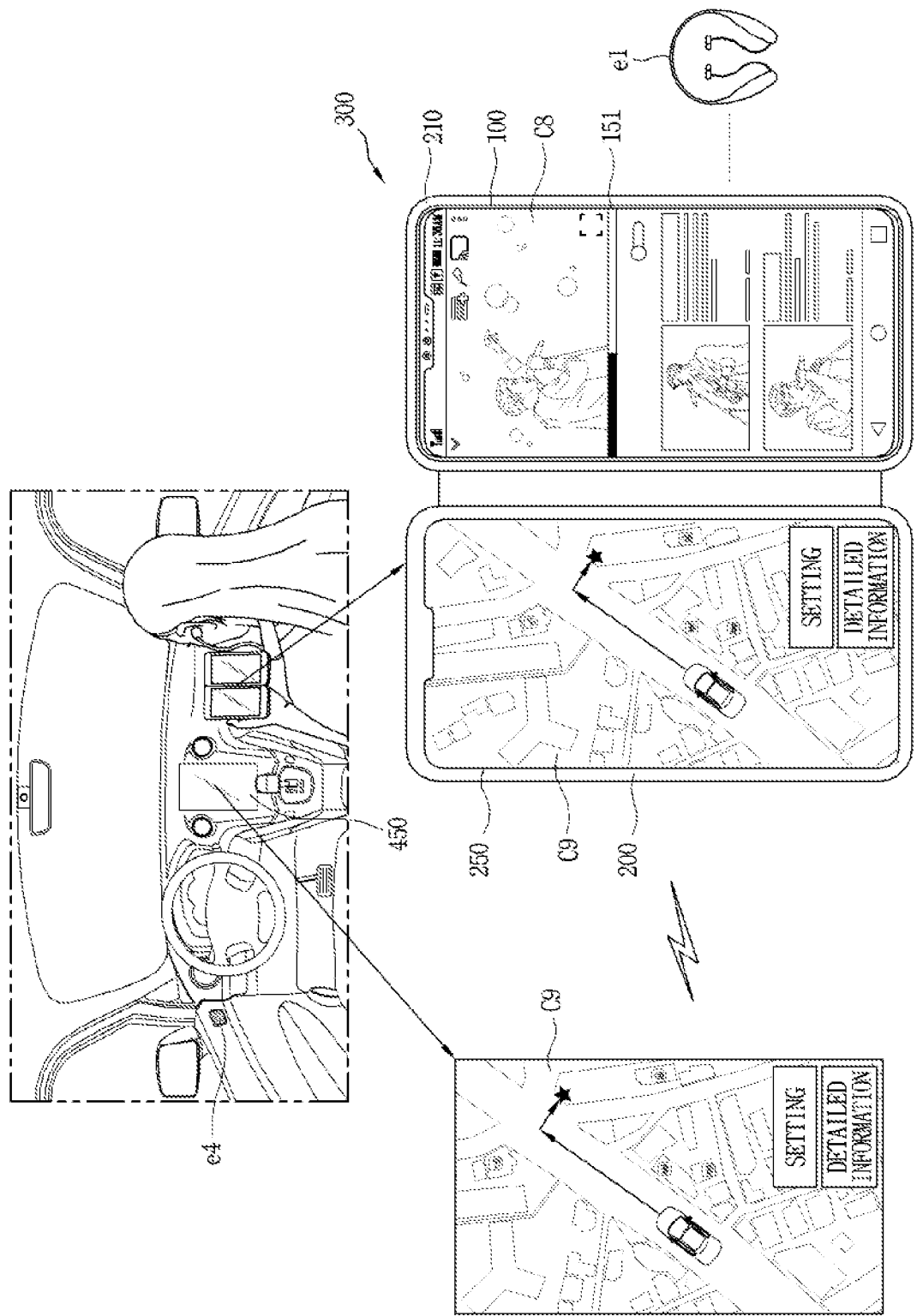
FIG. 13B is a view showing an example in which content items are displayed on a mobile terminal and a fourth display according to another embodiment.

According to any one of the first to second motions of the mobile terminal 100, the controller 180 may determine that the content C1 of the first display 151 or the content C2 of the second display 250 has been exchanged with the content of the fourth display 450 (see FIG. 13B).

A specific example in which the content C1 or the content C2 is exchanged with the content C3 or the content C4 is the same as the foregoing embodiment in which the content C1 is exchanged with the content C2 with reference to FIG. 8, and thus a description thereof will be omitted.

In addition, after the distance decreases and then increases in the first direction for a predetermined period of time (e.g., for several seconds) within a reference range, according to any one of the first to third motions of the mobile terminal 100, the controller 180 may determine that the content C1 of the first display 151 or the content C2 of the second display 250 has been exchanged with the content of the third display 350 (see FIG. 13A).

A specific example in which the content C1 of the first display 151 or the content C2 of the second display 250 has been exchanged with the content of the third display 350 (e.g., see FIG. 13A) is the same as described above, and thus a detailed description thereof will be omitted.

Hereinafter, a method of allowing the mobile terminal 100 to match an audio device to the third display 350 according to another embodiment will be described with reference to FIG. 13A.

FIG. 13A is a view showing an example in which content items are displayed on a mobile terminal and a third display according to another embodiment.

Referring to FIG. 13A, the mobile terminal 100 and the third display 350 may be wirelessly connected to each other. Specifically, the interface unit 160 and the third display 350 may be wirelessly connected to each other. The third display 350 includes a third audio device e3.

A first application and a second application in the mobile terminal 100 may be simultaneously executed.

The controller 180 may control the first display 151 and the third display 350 to display content C6 (e.g., a concert video) of the first application on the first display 151 and display content C7 of the second application on the third display 350.

Furthermore, the audio framework may control the first audio device e1 and the third audio device e3 to disallow a sound of the first application and a sound of the second application to overlap each other.

The third audio device e3 may be a speaker built in the third display 350, but the embodiment is not limited thereto.

More specifically, the audio framework may control the first audio device e1 and the third audio device e3 such that the first audio device e1 outputs a sound of the concert video C6 and the third audio device e3 outputs a sound of the children video C7.

Furthermore, as described above, the controller 180 may determine that the concert video C6 and the children video C7 have been exchanged according to any one of the first to third motions of the mobile terminal 100.

When the controller 180 determines that the concert video C1 and the children video C3 have been exchanged, the third display 350 and the third audio device e3 may be controlled such that the third display 350 outputs the concert video C1 and the third audio device e3 outputs a sound of the concert video C1.

For convenience of explanation, it has been described that the content C6 is displayed on the first display 151 in FIG. 13A, but the embodiment is not limited thereto, and the content C6 may be displayed on the second display 250 without being displayed on the first display 151. Furthermore, the content C6 may be simultaneously displayed on the first display 151 and the second display 250.

Hereinafter, another method of allowing the mobile terminal 100 to match an audio device to the fourth display 450 according to another embodiment will be described with reference to FIG. 13B.

FIG. 13B is a view showing an example in which content items are displayed on a mobile terminal and a fourth display according to another embodiment.

The mobile terminal 100 and the fourth display 450 may be wirelessly connected to each other. Specifically, the interface unit 160 and the fourth display 450 may be wirelessly connected to each other.

The interface unit 160 and the fourth display 450 may be wirelessly connected to each other. The fourth display 450 includes a fourth audio device e4.

The fourth display 450 may be a display mounted inside a vehicle, but the embodiment is not limited thereto, and the fourth audio device e4 may be at least one or more speakers mounted on the vehicle, but the embodiment is not limited thereto.

A first application and a second application in the mobile terminal 100 may be simultaneously executed.

The controller 180 may control the first display 151, the second display 250, and the fourth display 450 to display content C8 (e.g., a concert video) of the first application on the first display 151, and display content C9 (e.g., a navigation video) of the second application on the third display 250 and the fourth display 450.

In FIG. 13B, it is shown that the content C9 is displayed on both the second display 250 and the fourth display 450, but the embodiment is not limited thereto, and the content C9 may be displayed only on the fourth display 450.

The audio framework may control the first audio device e1 and the third audio device e4 to disallow a sound of the first application and a sound of the second application to overlap each other.

More specifically, the audio framework may control the first audio device e1 and the third audio device e4 such that the first audio device e1 outputs a sound of the concert video C8 and the third audio device e4 outputs a sound of the navigation video C9.

Furthermore, as described above, the controller 180 may determine that the concert video C8 and the navigation video C9 have been exchanged according to any one of navigation to third motions of the mobile terminal 100.

When the controller 180 determines that the concert video C1 and the navigation video C9 have been exchanged, the fourth display 450 and the fourth audio device e4 may be controlled such that the fourth display 450 outputs the concert video C8 and the fourth audio device e4 outputs a sound of the concert video C8.

In the above, an example in which a plurality of displays are three has been described for convenience of explanation, but the embodiment is not limited thereto, and three or more displays may also be wirelessly connected to the mobile terminal 100.

Accordingly, a plurality of users may simultaneously watch the same content item or different content items, and watch the content of the other party without exchanging audio devices only by exchanging the content items.

What is claimed is:

1. An electronic device comprising:
    a mobile terminal; and
    a case,
    wherein the mobile terminal comprises a terminal body coupled to the case, a connection port provided on one side of the terminal body, an interface unit that connects a first audio device and a second audio device to the mobile terminal, a controller, and a first display on which a first screen is displayed,
    wherein the case comprises a first body accommodating the terminal body, a connector protruding toward an inner side of the first body to be inserted into the connection port, a second display on which a second screen is displayed, and a wiring portion configured to electrically connect the first body and a second body,
    wherein the controller controls the first audio device and the second audio device to match the first display to the first audio device, match the second display to the second audio device, output a first sound corresponding to the first screen from the first audio device, and output a second sound corresponding to the second screen from the second audio device, and
    wherein the first screen is an execution screen of a first application and the second screen is an execution screen of a second application, and the first application and the second application are simultaneously executed,
    wherein the interface unit is further configured to wirelessly connect a third display on which a third screen is displayed and a third audio device to the mobile terminal,
    wherein the controller further controls the first audio device and the third audio device to match the first display to the first audio device, match the third display to the third audio device, output a first sound corresponding to the first screen from the first audio device, and output a third sound corresponding to the third screen from the third audio device, and
    wherein the first screen is an execution screen of a first application and the third screen is an execution screen of a third application, and the first application and the third application are simultaneously executed.

2. The electronic device of claim 1, wherein when a first content exchange is performed, the controller further controls the first audio device and the second audio device to match the first display to the first audio device, match the second display to the second audio device, output the second sound from the first audio device, and output the first sound from the second audio device, and
    wherein the performing of the first content exchange comprises displaying the second screen on the first display and displaying the first screen on the second display.

3. The electronic device of claim 2, wherein the performing of the first content exchange comprises performing a first direction drag on the first display or performing a second direction drag on the second display.

4. The electronic device of claim 3, wherein the first direction drag is a drag in a direction from the first display toward the second display, and the second direction drag is a drag in a direction from the second display toward the first display.

5. The electronic device of claim 4, wherein a first exchange icon is displayed on the first display, a second exchange icon is displayed on the second display, and the first content exchange is performed according to a touch of the first exchange icon or the second exchange icon.

6. The electronic device of claim 1, wherein the interface unit is further configured to calculate a distance between the mobile terminal and the third display using a signal strength between the mobile terminal and the third display, and to wirelessly connect the third display to the mobile terminal when the distance is included in a reference range.

7. The electronic device of claim 6, wherein when the distance decreases and then increases in a first direction for a predetermined period of time within the reference range, the controller further determines that positions of the mobile terminal and the third display have been exchanged.

8. The electronic device of claim 7, wherein the controller further determines that the positions of the mobile terminal and the third display have been exchanged, and then performs a second content exchange, and
    wherein the performing of the second content exchange comprises displaying the third screen on the first display and displaying the first screen on the third display, and the signal is a RSSI signal.

9. The electronic device of claim 6, wherein the electronic device further comprises a sensor unit capable of detecting a motion of the mobile terminal, and
    wherein after the distance decreases and then increases in a first direction for a predetermined period of time within the reference range, the controller further determines that the positions of the mobile terminal and the third display have been exchanged using the motion.

10. The electronic device of claim 9, wherein the controller further performs a third content exchange when it is determined that the positions of the mobile terminal the third display have been exchanged, and
    wherein the performing of the third content exchange comprises displaying the third screen on the first display and displaying the first screen on the third display.

11. The electronic device of claim 10, wherein the motion is any one of a motion in which an azimuth of the mobile terminal changes, a pitching motion of the mobile terminal, and a rolling motion of the mobile terminal.

12. The electronic device of claim 1, wherein the electronic device further comprises a sensor unit capable of detecting a motion of the mobile terminal, and
    wherein the controller further determines that the positions of the mobile terminal and the third display have been exchanged using the motion.

13. The electronic device of claim 12, wherein the controller further performs a second content exchange when it is determined that the positions of the mobile terminal the third display have been exchanged, and
    wherein the performing of the second content exchange comprises displaying the third screen on the first display and displaying the first screen on the third display.

14. The electronic device of claim 13, wherein the motion is any one of a motion in which an azimuth of the mobile terminal changes, a pitching motion of the mobile terminal, and a rolling motion of the mobile terminal.

* * * * *